(12) United States Patent
Tomeba et al.

(10) Patent No.: US 10,284,266 B2
(45) Date of Patent: May 7, 2019

(54) BASE STATION APPARATUS, TERMINAL APPARATUS, WIRELESS COMMUNICATION SYSTEM AND INTEGRATED CIRCUIT

(71) Applicant: Sharp Kabushiki Kaisha, Osaka-shi, Osaka (JP)

(72) Inventors: Hiromichi Tomeba, Osaka (JP); Takashi Onodera, Osaka (JP); Minoru Kubota, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/646,464

(22) PCT Filed: Dec. 3, 2013

(86) PCT No.: PCT/JP2013/082482
§ 371 (c)(1),
(2) Date: May 21, 2015

(87) PCT Pub. No.: WO2014/088003
PCT Pub. Date: Jun. 12, 2014

(65) Prior Publication Data
US 2015/0304001 A1    Oct. 22, 2015

(30) Foreign Application Priority Data
Dec. 6, 2012 (JP) .................................. 2012-266832

(51) Int. Cl.
*H04B 7/0456* (2017.01)
*H04B 7/04* (2017.01)
(Continued)

(52) U.S. Cl.
CPC ............. *H04B 7/0456* (2013.01); *H04B 7/04* (2013.01); *H04B 7/0404* (2013.01);
(Continued)

(58) Field of Classification Search
CPC ...... H04B 7/0639; H04B 7/04; H04B 7/0456; H04B 7/0404; H04B 7/0619; H04W 16/28
See application file for complete search history.

(56) References Cited

U.S. PATENT DOCUMENTS 8,787,261 B2    7/2014  Taoka et al.
8,913,674 B2    12/2014 Han et al.
(Continued)

FOREIGN PATENT DOCUMENTS

JP    2011-082705 A    4/2011
JP    2012-525739 A    10/2012
(Continued)

OTHER PUBLICATIONS

English translation of Official Communication issued in corresponding International Application PCT/JP2013/082482, dated Mar. 4, 2014.
(Continued)

*Primary Examiner* — Sung S Ahn
(74) *Attorney, Agent, or Firm* — Keating & Bennett, LLP

(57) ABSTRACT

A base station apparatus according to the present invention is capable of adjusting antenna gains in a horizontal direction and a vertical direction of the plurality of antennas included in the base station apparatus, by adjusting a phase and an amplitude of a signal addressed and transmitted to a terminal apparatus, stores a codebook which is shared with the terminal apparatus and describes a plurality of linear filters associated with antenna gains in the horizontal direction and antenna gains in the vertical direction, acquires control information indicating at least one out of a plurality of linear filters described in the codebook, of which notification is sent from the terminal apparatus, performs precoding on the signal addressed to the terminal apparatus, based (Continued)

on the control information and the first codebook, and transmits the signal subjected to the precoding.

10 Claims, 12 Drawing Sheets

(51) Int. Cl.
    *H04M 1/725*     (2006.01)
    *H04B 7/06*     (2006.01)
    *H04B 7/0404*     (2017.01)
    *H04L 27/00*     (2006.01)

(52) U.S. Cl.
    CPC ......... *H04B 7/0617* (2013.01); *H04B 7/0619* (2013.01); *H04M 1/725* (2013.01); *H04L 2027/0053* (2013.01)

(56) References Cited

U.S. PATENT DOCUMENTS

| | | | |
|---|---|---|---|
| 8,953,522 B2 | 2/2015 | Han et al. | |
| 9,178,596 B2 | 11/2015 | Han et al. | |
| 9,287,949 B2 | 3/2016 | Han et al. | |
| 9,325,402 B2 | 4/2016 | Han et al. | |
| 9,887,758 B2 | 2/2018 | Han et al. | |
| 2009/0080560 A1* | 3/2009 | Na | H04B 7/0617 375/267 |
| 2009/0103593 A1* | 4/2009 | Bergamo | H04B 1/707 375/146 |
| 2009/0296650 A1* | 12/2009 | Venturino | H04W 16/28 370/330 |
| 2010/0150266 A1* | 6/2010 | Mondal | H04B 7/0417 375/296 |
| 2011/0235586 A1 | 9/2011 | Han et al. | |
| 2011/0249637 A1* | 10/2011 | Hammarwall | H04B 7/0634 370/329 |
| 2011/0261898 A1* | 10/2011 | Huang | H04B 7/0434 375/295 |
| 2012/0045018 A1 | 2/2012 | Zhou et al. | |
| 2012/0082248 A1 | 4/2012 | Han et al. | |
| 2012/0195264 A1 | 8/2012 | Taoka et al. | |
| 2013/0258964 A1* | 10/2013 | Nam | H04W 72/046 370/329 |
| 2013/0308714 A1* | 11/2013 | Xu | H04B 7/0417 375/267 |
| 2013/0308715 A1* | 11/2013 | Nam | H04B 7/0469 375/267 |
| 2014/0023157 A1 | 1/2014 | Shimezawa et al. | |
| 2014/0098689 A1* | 4/2014 | Lee | H04B 7/0469 370/252 |
| 2014/0177749 A1* | 6/2014 | Wu | H04L 25/03923 375/267 |
| 2014/0192761 A1* | 7/2014 | Inoue | H04B 7/0456 370/329 |
| 2015/0085954 A1 | 3/2015 | Han et al. | |
| 2015/0098432 A1 | 4/2015 | Han et al. | |
| 2015/0180557 A1* | 6/2015 | Kim | H04B 7/0456 375/267 |
| 2015/0381250 A1 | 12/2015 | Han et al. | |
| 2016/0013853 A1 | 1/2016 | Han et al. | |

FOREIGN PATENT DOCUMENTS

| | | |
|---|---|---|
| JP | 2012-222429 A | 11/2012 |
| WO | 2011/122835 A2 | 10/2011 |
| WO | 2012/046988 A2 | 4/2012 |

OTHER PUBLICATIONS

Alcatel-Lucent Shanghai Bell, Alcatel-Lucent, "Considerations on CSI Feedback Enhancements for High-Priority Antenna Configurations", 3GPP TSG-RAN WG1 #66, R1-112420, Aug. 22-26, 2011, 7 pages.

Alcatel-Lucent et al.,"Way Forward on 8Tx Codebook for Rel.10 DL MIMO", 3GPP TSG RAN WG1 62, R1-105011, Aug. 23-27, 2010, 6 pages.

Alcatel-Lucent, "UE PMI Feedback Signaling for User Pairing/ Coordination", 3GPP TSG RAN WG1 #55bis, R1-090051, Jan. 12-16, 2009, pp. 1-3.

ZTE Corporation, "View on 3GPP Rel-12 and Beyond", 3GPP RWS-120034, Jun. 2012, 17 pages.

LG Electronics; "Feedback Codebook Design and Performance Evaluation"; 3GPP TSG RAN WG1 Meeting #61bis; R1-103970; Jun. 28-Jul. 2, 2010; 6 pages.

\* cited by examiner

BASE STATION APPARATUS, TERMINAL APPARATUS, WIRELESS COMMUNICATION SYSTEM AND INTEGRATED CIRCUIT

TECHNICAL FIELD

The present invention relates to a wireless communication technology, and in particular, a technology for performing codebook-based closed loop type multiple input multiple output transmission.

BACKGROUND ART

In long term evolution (LTE) which has been standardized by the 3rd Generation Partnership Project (3GPP) as the 3.9 generation wireless transmission system, a multiple input multiple output (MIMO) technology performing wireless transmission using a plurality of transmission and reception antennas has been specified in order to significantly improve frequency use efficiency from the third-generation wireless transmission method. It is possible to realize improvement of the transmission speed, without increasing the frequency bandwidth, due to a spatial division multiplexing technology that is one of MIMO technologies. In order to achieve a peak transmission rate of 1 Gbps on downlink (referring to communication from a base station apparatus to a terminal apparatus) transmission in the LTE-Advanced (LTE-A) that is the developed version of LTE, a single-user MIMO (SU-MIMO) capable of spatially multiplexing eight streams at maximum is considered. The SU-MIMO is MIMO transmission between a base station apparatus having a plurality of transmission antennas and a single terminal apparatus having a plurality of reception antennas.

The MIMO transmission is roughly divided into closed-loop type MIMO transmission in which a transmission apparatus (base station apparatus) requires channel information (CSI) and open-loop type MIMO transmission in which CSI is not required, and it is reported that the achievable frequency use efficiency in the closed-loop type MIMO is greater than in the open-loop type MIMO. However, in the case of a wireless communication system based on frequency division duplex using different carrier frequencies in the uplink and downlink, it is necessary to feed back the CSI from the terminal apparatus in order for the base station apparatus to achieve the CSI, and thus there is a problem of a significant increase in the overhead.

Thus, in LTE, a codebook-based closed-loop type MIMO transmission capable of significantly suppressing the amount of overhead related to the notification of CSI is supported. In the codebook-based closed-loop type MIMO, a codebook describing a plurality of linear filters is previously shared between the base station apparatus and the terminal apparatus, and the terminal apparatus extracts a desired transmission filter from the codebook described above and notifies the base station apparatus of the number (index). The base station apparatus performs precoding on the transmission data, based on the linear filter of which notification is sent, and then performs MIMO transmission. Since the notification of the CSI is sent based on the codebook, it is possible to more significantly suppress the amount of overhead, as compared to a method in which the terminal apparatus directly quantizes the CSI and notifies the base station apparatus of the CSI.

Further, in NPL 1, for the purpose of suppressing an increase in overhead due to an increase in the number of transmission antennas, a codebook of a double codebook structure is suggested. This realizes MIMO transmission of multiple streams while suppressing an increase in the overhead to the minimum by using two codebooks: a first codebook corresponding to an antenna gain in the same polarized wave, and a second codebook corresponding to a phase difference between the polarized waves on the assumption of using polarized transmission and reception antennas.

Meanwhile, a plurality of terminal apparatuses which are simultaneously connected are regarded as a virtual large-scale antenna array, and LTE supports multi-user MIMO (MU-MIMO) which spatially multiplexes a transmission signal from the base station apparatus to each terminal apparatus. Similar to the SU-MIMO, even in the MU-MIMO, the terminal apparatuses notify the base station apparatus of the desired linear filters from the codebook, and the base station apparatus determines whether to perform the MU-MIMO in which the data addressed to the plurality of terminal apparatuses is spatially multiplexed, based on the linear filters of which notification is sent from the plurality of terminal apparatuses, and transmits the spatially multiplexed data.

However, in the codebook-based MU-MIMO in which the terminal apparatus does not report the CSI itself, an opportunity to perform spatial multiplexing is not significantly improved. Thus, a technology called BPMI feedback in which the terminal apparatus notifies the base station apparatus of Best companion PMI (BPMI) representing the linear filter having the best compatibility with the desired linear filter for spatial multiplexing, in addition to the desired linear filter is discussed in NPL 2. This is a method in which the base station apparatus acquires the desired linear filter and the BPMI of which notification is sent from the plurality of terminal apparatuses, and spatially multiplexes the terminal apparatuses of which the desired linear filters thereof are the BPMIs of the opponent terminal apparatuses, and this enables improvement of the opportunity to perform spatial multiplexing of a codebook-based MU-MIMO.

However, the MIMO transmission considered in LTE is 2D-MIMO considering only an antenna gain in the horizontal direction. Meanwhile, for the purpose of improving the opportunity to perform spatial multiplexing in the MU-MIMO described above, 3D-MIMO also considering an antenna gain in the vertical direction is discussed in NPL 3 and the like. If the space resource in the vertical direction is used, more efficient suppression of inter-user interference is possible, such that the improvement of the opportunity to perform spatial multiplexing of MU-MIMO and the improvement of the frequency use efficiency of SU-MIMO can be expected.

CITATION LIST

Non Patent Literature

NPL 1: 3GPP R1-105011, Alcatel-Lucent, et. al., "Way Forward on 8Tx Codebook for Rel.10 DL MIMO," August 2010.

NPL 2: 3GPP R1-090051, Alcatel-Lucent, "UE PMI feedback signaling for user pairing/coordination," January 2009.

NPL 3: 3GPP RWS-120034, ZTE, "View on 3GPP Rel-12 and beyond," June 2012.

SUMMARY OF INVENTION

Technical Problem

According to the 3D-MIMO transmission also considering an antenna gain in the vertical direction, the space resource in the vertical direction can be used, such that the improvement of the opportunity to perform spatial multiplexing of MU-MIMO can be expected, and the improvement of the frequency use efficiency of SU-MIMO can be expected.

However, with an increase in the number of transmission antenna elements, there is a problem of an increase in overhead associated with transmission of a reference signal for channel estimation. Further, with an increase in the number of transmission antenna elements, the number of linear filters that should be described in a codebook also increases, and thus the overhead associated with the linear filter notification described in the codebook also increases.

Thus, the 3D-MIMO is effective for improving the frequency use efficiency, but an increase in the overhead associated with the reference signal causes the improvement of the frequency use efficiency to be limited. However, actually, a method of realizing a 3D-MIMO with high efficiency while suppressing an increase in the overhead is not clear yet.

The present invention has been made in view of such circumstances, and an object thereof is to provide a base station apparatus, a terminal apparatus, a wireless communication system, and an integrated circuit, which realize suppression of an amount of overhead associated with the notification from the terminal apparatus, in codebook-based 3D-MIMO.

Solution to Problem

To achieve the above object, the present invention uses the following means. In other words, a base station apparatus according to the present invention is a base station apparatus including a plurality of antennas and capable of adjusting antenna gains in a horizontal direction and a vertical direction of the plurality of antennas, by adjusting a phase and an amplitude of a signal addressed and transmitted to a terminal apparatus, from the plurality of antennas, including a first codebook storage unit that stores a first codebook which is shared with the terminal apparatus and includes a second codebook describing a plurality of linear filters associated with antenna gains in the horizontal direction and a third codebook describing a plurality of linear filters associated with antenna gains in the vertical direction; a control information acquisition unit that acquires control information indicating at least one out of a plurality of linear filters described in the second codebook and a plurality of linear filters described in the third codebook, of which notification is sent from the terminal apparatus; a precoding unit that performs precoding on the signal addressed to the terminal apparatus, based on the control information and the first codebook; and a wireless transmission unit that transmits the signal subjected to the precoding.

A terminal apparatus according to the present invention is a terminal apparatus which is a first terminal apparatus communicating with a base station apparatus including a plurality of antennas and capable of adjusting antenna gains in a horizontal direction and a vertical direction of the plurality of antennas, by adjusting a phase and an amplitude of a signal addressed and transmitted to the terminal apparatus, from the plurality of antennas, including a first codebook storage unit that stores a first codebook which is shared with the base station apparatus and includes a second codebook describing a plurality of linear filters associated with antenna gains in the horizontal direction and a third codebook describing a plurality of linear filters associated with antenna gains in the vertical direction; a feedback information generation unit that generates control information indicating at least one out of a plurality of linear filters described in the second codebook and a plurality of linear filters described in the third codebook; and a wireless transmission unit that notifies the base station apparatus of the control information.

An integrated circuit according to the present invention is an integrated circuit which is mounted in a base station apparatus including a plurality of antennas and capable of adjusting antenna gains in a horizontal direction and a vertical direction of the plurality of antennas, by adjusting a phase and an amplitude of a signal addressed and transmitted to a terminal apparatus, from the plurality of antennas, and causes the base station apparatus to exert a series of functions including a function of storing a first codebook which is shared with the terminal apparatus and includes a second codebook describing a plurality of linear filters associated with antenna gains in the horizontal direction and a third codebook describing a plurality of linear filters associated with antenna gains in the vertical direction; a function of acquiring control information indicating at least one out of a plurality of linear filters described in the second codebook and a plurality of linear filters described in the third codebook, of which notification is sent from the terminal apparatus; a function of performing precoding on the signal addressed to the terminal apparatus, based on the control information and the first codebook; and a function of transmitting the signal subjected to the precoding.

An integrated circuit according to the present invention is an integrated circuit which is mounted in a terminal apparatus communicating with a base station apparatus including a plurality of antennas and capable of adjusting antenna gains in a horizontal direction and a vertical direction of the plurality of antennas, by adjusting a phase and an amplitude of a signal addressed and transmitted to the terminal apparatus, from the plurality of antennas, and causes the terminal apparatus to exert a series of functions including a function of storing a first codebook which is shared with the base station apparatus and includes a second codebook describing a plurality of linear filters associated with antenna gains in the horizontal direction and a third codebook describing a plurality of linear filters associated with antenna gains in the vertical direction; a function of generating control information indicating at least one out of a plurality of linear filters described in the second codebook and a plurality of linear filters described in the third codebook; and a function of notifying the base station apparatus of the control information.

Advantageous Effects of Invention

The present invention greatly contributes the improvement of the frequency use efficiency, while suppressing the amount of overhead related to the notification from the terminal apparatus, in codebook-based 3D-MIMO.

DESCRIPTION OF EMBODIMENTS

The following description will be made regarding embodiments in the case of applying a wireless communication system of the present invention, with reference to the drawings. In addition, aspects for understanding the present invention will be described in the embodiments, and the content of the invention is not to be interpreted to be limited to the embodiments. Unless otherwise indicated, in the following description, * denotes the Kronecker product of matrices.

1. First Embodiment

Figure 1:
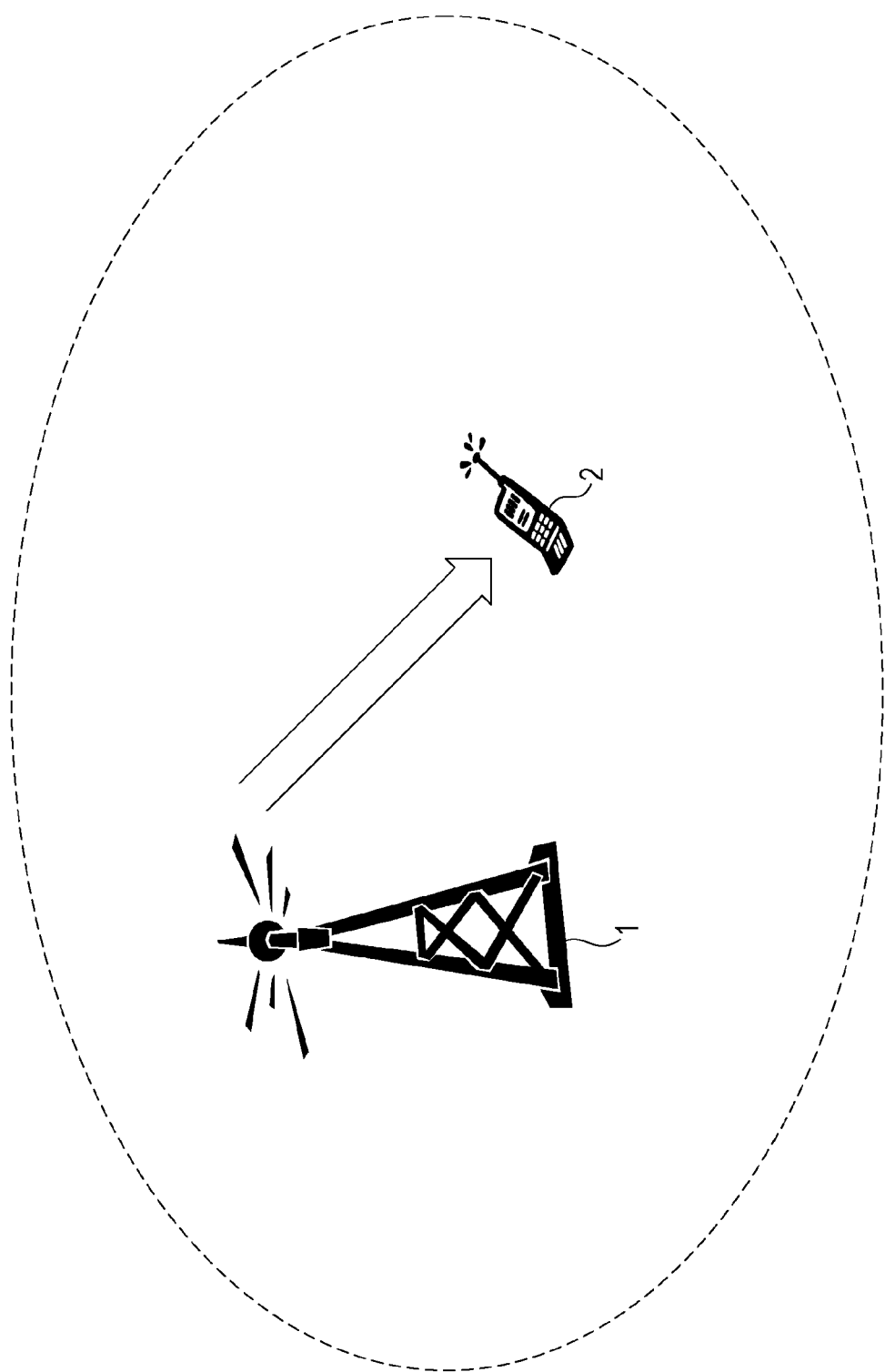
FIG. 1 is a diagram illustrating an overview of a wireless communication system according to a first embodiment of the present invention.

FIG. 1 is a diagram illustrating an overview of a wireless communication system according to the first embodiment of the present invention. The first embodiment targets SU-MIMO transmission in which a terminal apparatus 2 having $N_r$ reception antennas (also referred to as a wireless reception apparatus) is connected to a base station apparatus 1 having $N_t$ transmission antennas (also referred to as a wireless transmission apparatus). Of course, it does not matter that another terminal apparatus 2 is connected to the base station apparatus 1 by using another radio resource, but in the following description, transmission between the base station apparatus 1 and the terminal apparatus 2 is illustrated as FIG. 1. It is assumed that L pieces of data are simultaneously transmitted to the terminal apparatus 2 (the number data that can be simultaneously transmitted is referred to the number of ranks), where $L \leq N_r$. However, for the sake of simplicity, the following description will be made as $L=1$.

An orthogonal frequency division multiplexing (OFDM) having $N_c$ subcarriers is assumed as a transmission scheme. Further, a frequency division duplex is assumed as a duplex scheme, but a time division duplex for performing CSI feedback having is also included in the present embodiment.

Figure 2:
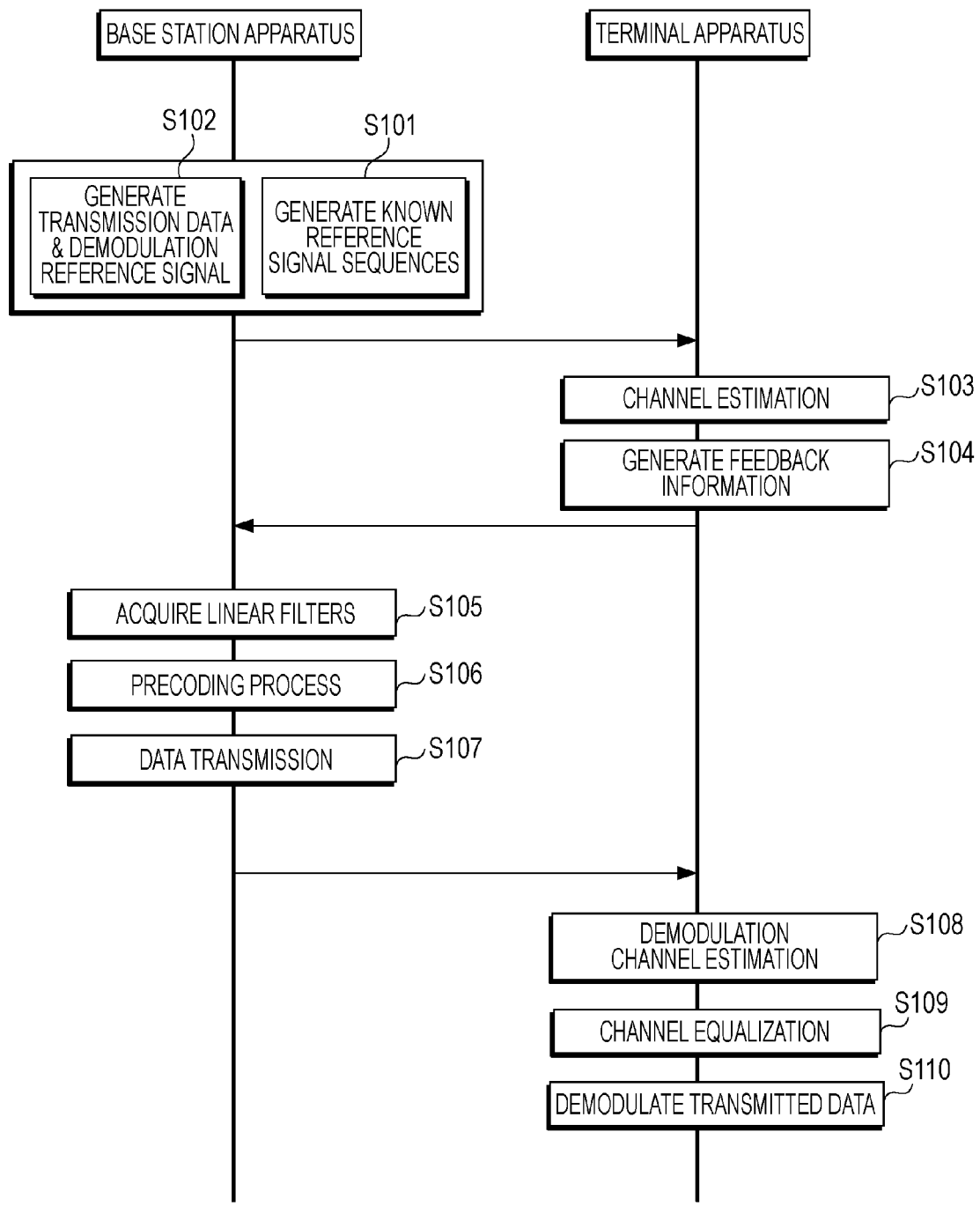
FIG. 2 is a sequence chart illustrating an aspect of communication between a base station apparatus and a terminal apparatus.

FIG. 2 is a sequence chart illustrating an overview of a signal processing procedure in an entire system according to the first embodiment of the present invention. First, the base station apparatus 1 transmits known reference signal sequences to the terminal apparatus 2 connected thereto (step S101). A first reference signal sequence and a second reference signal sequence are included in the known reference signal sequence and are respectively associated with transmission antennas mounted in the base station apparatus 1, but the details will be described later. Further, the base station apparatus 1 generates transmission data addressed to the terminal apparatus 2 and a demodulation reference signal, separately from known reference signal sequence (step S102). Then, the terminal apparatus 2 performs channel estimation based on the received known reference signal sequence (step S103). The terminal apparatus extracts a first linear filter from a known codebook based on the channel information that is estimated based on the first reference signal sequence, and a second linear filter from the known codebook based on the channel information that is estimated based on the second reference signal sequence (step S104). The terminal apparatus 2 notifies the base station apparatus 1 of the linear filter numbers (indices).

The base station apparatus 1 acquires the first and second linear filters, based on the indices of which notification is sent from the terminal apparatus 2 (step S105), and performs transmission coding (precoding) on the transmission data destined for the terminal apparatus 2, based on the information (step S106). The base station apparatus 1 performs spatial multiplexing on the precoded data to the same radio resource, and transmits the spatially multiplexed data to the terminal apparatus 2 (step S107).

The terminal apparatus 2 that receives the signal transmitted by the base station apparatus 1 performs channel estimation based on the demodulation reference signal (step S108), performs a channel equalization process on the received signal, based on the estimation result (step S109), and detects desired data of the terminal apparatus 2 (step S110).

[1.1. Base Station Apparatus 1]

Figure 3:
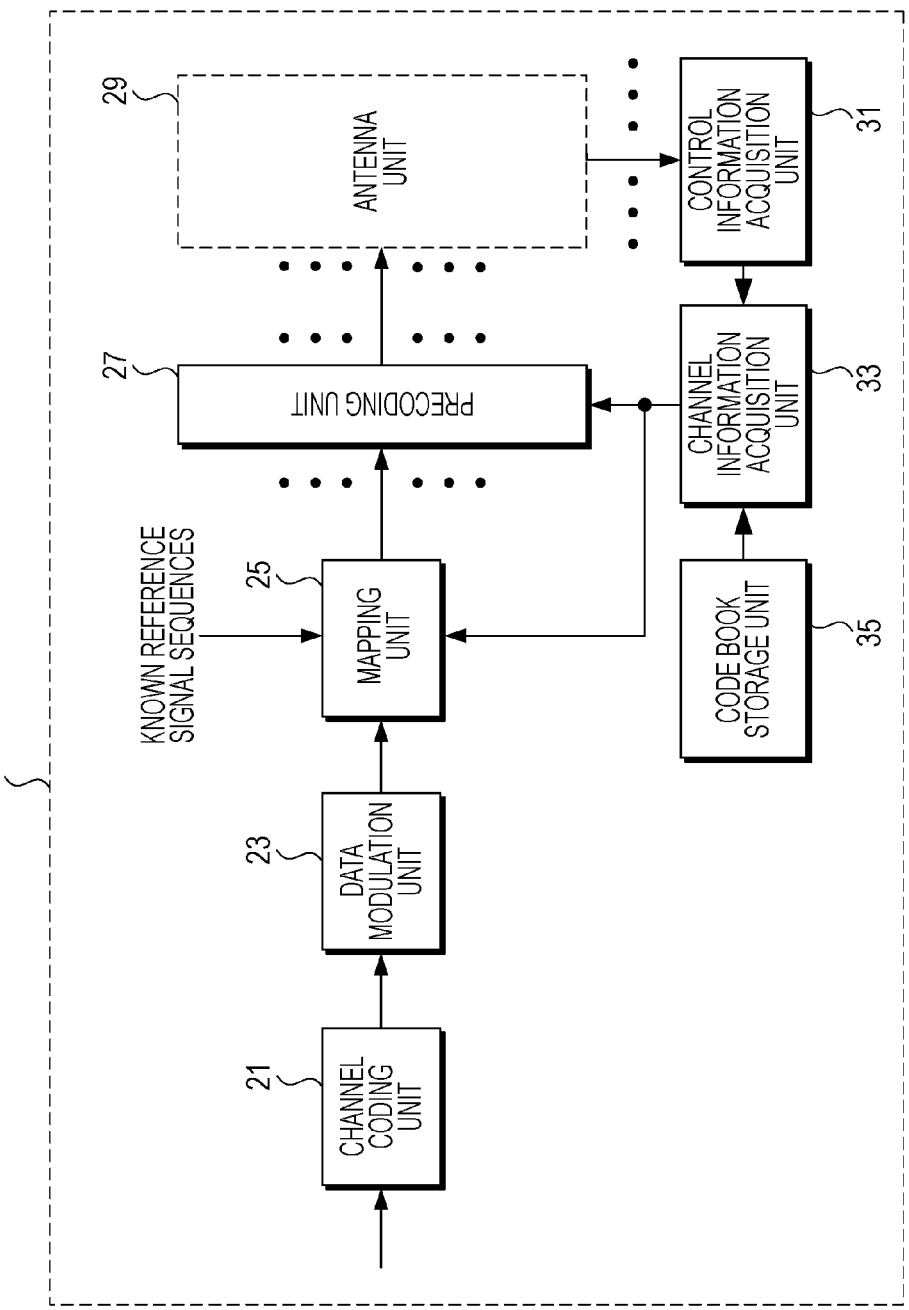
FIG. 3 is a block diagram illustrating a configuration of the base station apparatus according to the first embodiment of the present invention.

FIG. 3 is a block diagram illustrating a configuration of the base station apparatus 1 according to the first embodiment of the present invention. As illustrated in FIG. 3, the base station apparatus 1 is configured to include a channel coding unit 21, a data modulation unit 23, a mapping unit 25, a precoding unit 27, an antenna unit 29, a control information acquisition unit 31, a channel information acquisition unit 33, and a codebook storage unit 35. There are precoding units 27 of the number of subcarriers $N_c$, and antenna units 29 of the number of transmission antennas $N_t$.

Figure 4:
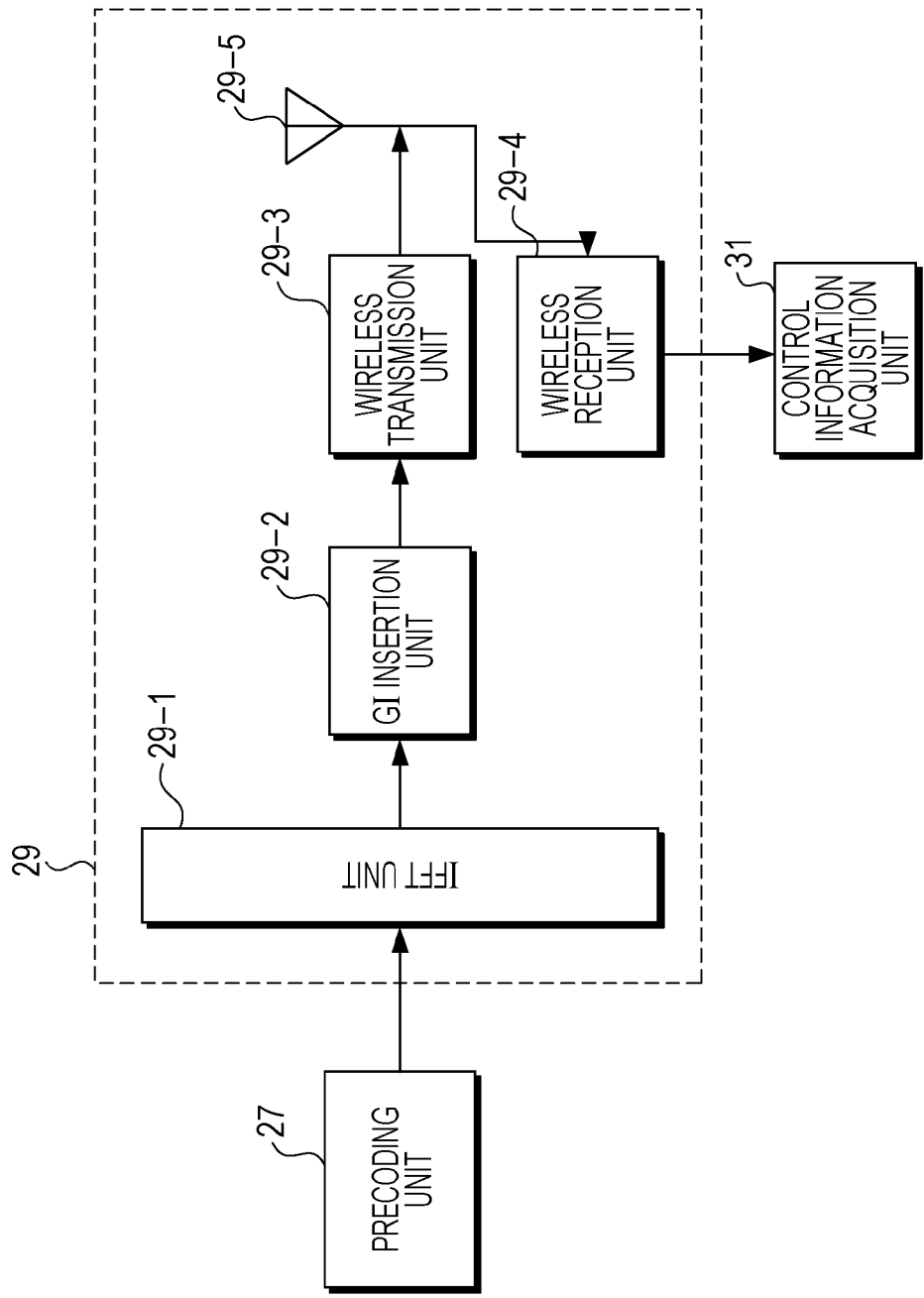
FIG. 4 is a block diagram illustrating a configuration of an antenna unit 29 according to the first embodiment of the present invention.

FIG. 4 is a block diagram illustrating a configuration of the antenna unit 29 according to the first embodiment of the present invention. As illustrated in FIG. 4, the antenna unit 29 is configured to include an IFFT unit 29-1, a GI insertion unit 29-2, a wireless transmission unit 29-3, a wireless reception unit 29-4, and an antenna 29-5.

Since there are antenna units 29 of the number of transmission antennas $N_t$, there are antennas 29-5 of the number of transmission antennas $N_t$. In the present embodiment, it is assumed that the antennas 29-5 are arranged not only in the horizontal direction (Horizontal domain) but also in the vertical direction (Vertical domain).

Figure 5:
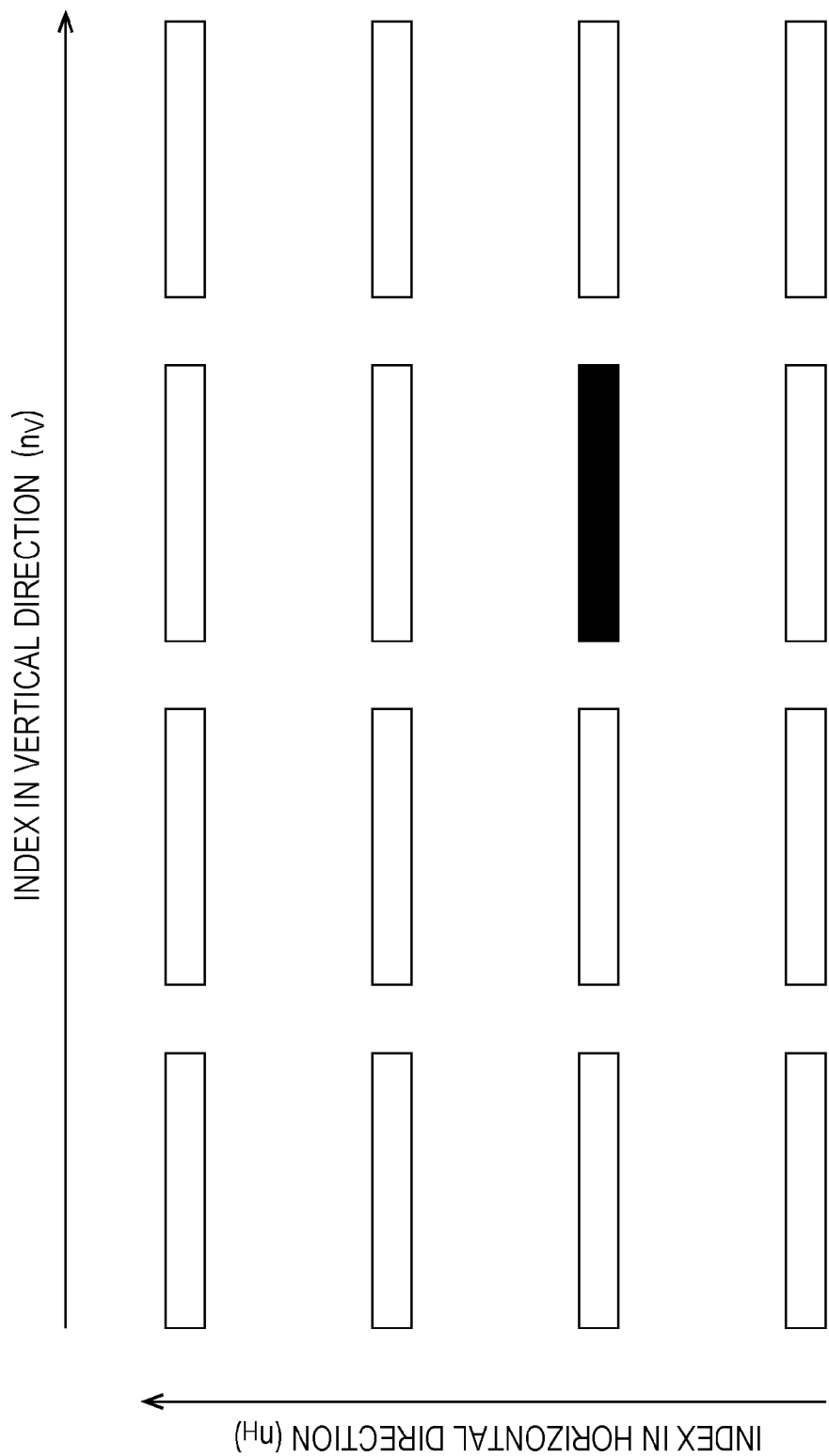
FIG. 5 is a diagram illustrating an outline of the arrangement of an antenna 29-5 according to the first embodiment of the present invention.

FIG. 5 is a diagram illustrating an outline of the arrangement of the $N_t$ numbers of antennas 29-5 according to the first embodiment of the present invention. As illustrated in FIG. 5, in the present embodiment, it is assumed that a plurality of dipole antennas are arranged in a square shape in the horizontal direction and the vertical direction. Then, as an index for designating each antenna 29-5, the index in the horizontal direction is defined as $n_H$, and the index in the vertical direction is defined as $n_V$. In FIG. 5, the antenna 29-5 that is modified with black is designated as $(n_H=2, n_V=3)$.

In the following, the antenna group in the horizontal direction given by $(n_V, n_H)=[(n_V, 1), (n_V, 2), (n_V, 3), (n_V, 4)]$ is referred to as the $n_V$ row-th antenna group, or simply referred to as the $n_V$ row-th antenna. Similarly, the antenna group in the vertical direction given by $(n_V, n_H)=[(1, n_H), (2, n_H), (3, n_H), (4, n_H)]$ is referred to as the $n_H$ column-th antenna group, or simply referred to as the $n_H$ column-th antenna.

In addition, in the present embodiment, the arrangement method of the antenna 29-5 is not limited to the method of FIG. 5. For example, polarization antennas may be arranged. Further, the number of elements in the horizontal direction and the number of elements in the vertical direction may be different.

Further, it is also possible to consider a plurality of antenna elements as one antenna. For example, in FIG. 5, four antenna elements are arranged in the horizontal direction and the vertical direction, but if two antenna elements in the vertical direction are regarded as one antenna (also referred to as an antenna port), it is possible to consider that two antennas are arranged in the vertical direction. In this case, assuming that the same signal is basically transmitted from the antenna elements that are regarded as one antenna, the transmission signal processing of the baseband is performed by the base station apparatus 1.

The base station apparatus 1 performs a transmission signal process of a baseband in units of antenna ports. Further, when the antenna 29 of the base station apparatus 1 is an active antenna, the base station apparatus 1 can performs phase control for each antenna element. In this case, the base station apparatus may perform phase control for each antenna element group constituting an antenna port.

In addition, when the base station apparatus 1 performs the phase control for the antenna element, the terminal apparatus 2 can estimate information regarding the phase control, by using the known reference signal that has been transmitted from the base station apparatus 1. Specifically, the information regarding the phase control is included in a channel estimation value that the terminal apparatus 2 estimates by using the known reference signal.

Returning to FIG. 3, the signal processing of the base station apparatus 1 will be described. First, the control information acquisition unit 31 acquires control information of which notification is sent from the connected terminal apparatus 2, and outputs the control information associated with the first and second linear filters among the control information, to the channel information acquisition unit 33.

The channel information acquisition unit 33 acquires a first linear filter W1 and a second linear filter W2, based on the control information that is input from the control information acquisition unit 31 and the codebook (referred to as the first codebook) stored in the codebook storage unit 35, and outputs the acquired filters to the precoding unit 27. Here, the first linear filter W1 is associated with the antenna group in the horizontal direction, and the second linear filter W2 is associated with the antenna group in the vertical direction. Here, since the number of antennas in each of the horizontal direction and the vertical direction is four, W1 and W2 are represented by the matrix of which the number of rows is four. The number of columns of W1 and W2 is determined according to the number of transmission ranks and the like. In the following description, since rank 1 transmission is assumed, the number of columns is one.

Next, after the channel coding unit 21 performs channel coding on a transmission data sequence addressed to the terminal apparatus 2, the data modulation unit 23 performs digital data modulation such as QPSK and 16QAM. The data modulation unit 23 inputs the data signal subjected to the data modulation, to the mapping unit 25.

The mapping unit 25 performs mapping (also referred to as scheduling or resource allocation) for placing each piece of data to the specified radio resource (resource element, or simply referred to as a resource). Here, the radio resource mainly refers to a frequency, a time, a code, and a space. The radio resource to be used is determined based on the reception quality that is observed by the terminal apparatus 2, the linear filters W1 and W2, and the like. In the present embodiment, it is assumed that the radio resource to be used is predetermined and both the base station apparatus 1 and the terminal apparatus 2 can understand. In addition, the mapping unit 25 performs the multiplexing of the known reference signal sequence for performing the channel estimation in the terminal apparatus 2.

It is assumed that the reference signals addressed to the terminal apparatuses 2 are multiplexed so as to be orthogonal to each other such that the reference signals are able to be separated in the terminal apparatuses 2 receive the reference signal. Further, although it is assumed that two reference signals: a reference signal for channel estimation CSI-reference signal (CSI-RS) and a demodulation reference signal (DMRS) that is a specific reference signal for demodulation are multiplexed, it may be configured to further multiplex another reference signal.

The CSI-RS is intended to estimate the CSI that is observed by the terminal apparatus 2. In the present embodiment, the mapping unit 25 arranges the CSI-RS so as to be orthogonal between the transmission antennas. For example, in a case of assuming the antenna arrangement as illustrated in FIG. 5, since the number of transmission antennas $N_t$ is 16, at least 16 resource elements are required for transmission of CSI-RS. Similar to the method that has been considered from the past, the mapping unit 25 may arrange the CSI-RS so as to be orthogonal between all of 16 antennas. Further, in the present embodiment, the mapping unit 25 may perform control such that the CSI-RS is to be transmitted as described below, in order to suppress the overhead associated with the transmission of CSI-RS.

The CSI-RS is used for the terminal apparatus 2 to calculate a desired linear filter. In some cases, the desired linear filter that is estimated by the terminal apparatus 2 depends on the statistical property (for example, a space correlation value, and the like) of the channel between the base station apparatus 1 and the terminal apparatus 2. The channel statistical properties characterizing the antennas arranged in the horizontal direction and the channel statistical properties characterizing the antennas arranged in the vertical direction are different, but the channel statistical properties characterizing the antennas arranged in the horizontal direction (or vertical direction) are substantially the same.

For example, in FIG. 5, although the channel statistical properties characterizing the first row antenna group (that is, the antenna group in the horizontal direction given by $(n_V, n_H)=[(1, 1), (1, 2), (1, 3), (1, 4)]$) and the channel statistical properties characterizing the first column antenna group (that is, the antenna group in the vertical direction given by $(n_V, n_H)=[(1, 1), (2, 1), (3, 1), (4, 1)]$) are different, the channel statistical properties respectively characterizing the first row antenna group and the second row antenna group are substantially the same. Of course, the third row antenna and the fourth row antenna are also the same.

This represents that the linear filter aligned in the first row antenna group and the linear filter aligned in the second row antenna group are highly likely to match with each other, and the linear filter aligned in the first column antenna group and the linear filter aligned in the first row antenna group are highly likely not to match with each other.

Focusing on this, in the present embodiment, the mapping unit 25 may perform control so as to transmit only the CSI-RS by which the channel statistical properties characterizing any $n_V$-th row antenna group and the channel statistical properties characterizing any $n_H$-th column antenna group can be estimated. For example, when the antenna arrangement illustrated in FIG. 5 is made, the CSI-RSs which are orthogonal to each other may be transmitted from seven transmission antennas of $(n_V, n_H)=[(1, 1), (1, 2), (1, 3), (1, 4), (2, 1), (3, 1), (4, 1)]$.

The combination of transmission antennas for transmitting the CSI-RS is not limited thereto, and the mapping unit 25 may periodically assign the $n_V$-th row antenna group and the $n_H$-th column antenna group through which the CSI-RSs are transmitted. Further, the periods (or granularities) of the CSI-RSs which are transmitted from the $n_V$-th row antenna group and the $n_H$-th column antenna group may be different. For example, the mapping unit 25 may control so as to make the granularity of the CSI-RS that is transmitted from the $n_V$-th row antenna group denser than the granularity of the $n_H$-th column antenna group, and vice versa. Further, the radio resources through which the CSI-RSs are orthogonal may be any of the time, the frequency, and the code.

Meanwhile, since the DMRS is a reference signal required for the terminal apparatus 2 to demodulate the reception signal, the DMRSs each associated with the data stream that is transmitted from the base station apparatus 1 to the terminal apparatus 2 are multiplexed. The mapping unit 25 arranges the DMRS so as to be orthogonal between the associated data stream. The mapping unit 25 inputs the mapped data information and the like to the precoding unit 27 respective corresponding subcarrier.

The precoding unit 27 performs precoding on transmission data which is input from the mapping unit 25, based on a first linear filter W1 and a second linear filter W2 which are input from the channel information acquisition unit 33. There is no limit to the precoding method, but the following description will be made assuming that the precoding unit 27 performs a linear precoding based on the input linear filter.

Here, it is assumed that a data signal (or DMRS) that is transmitted in a certain subcarrier is d, and transmission signal vector after preceding is represented as $s=[s_{1,1}, s_{1,2}, \ldots, s_{4,3}, s_{4,4}]^T$. Here, $s_{n_V, n_H}$ represents a transmission signal that is transmitted from the $(n_V, n_H)$-th antenna. The transmission signal vector is given by Equation (1).

[Equation 1]

$$s=(W_2 * W_1)d \quad (1)$$

In addition, transmission power is given to the actual transmission signal, but is omitted, here. With the transmission signal vector, each element of W1 is multiplied to the signal transmitted from the $n_V$-th row antenna, and each element of W2 is multiplied to the signal transmitted from the $n_H$-th column antenna. In other words, two weights are multiplied to one data signal.

The transmission signal vector given by Equation (1) has an aspect in which the transmission antenna combination for the signal being transmitted from the antenna group in the horizontal direction is considered first and then the transmission antenna combination in the antenna group in the horizontal direction is considered. Of course, the order of the antenna combination may be reverse, and the precoding unit 27 may perform precoding without considering the polarized antenna combination.

After the precoding unit 27 performs precoding given by Equation (1) on the data signal and the DMRS, and outputs the result to the antenna unit 29. In the above description, the number of transmission ranks is 1, but when the number of transmission ranks is 2 or more, the data signal and the DMRS are denoted as a vector, and the number of columns of W1 and W2 also becomes 2 or more. However, basically, the precoding unit 27 separately considers the transmission antenna combination in the horizontal direction and the transmission antenna combination in the vertical direction, and finally, may perform precoding so as to separately combine the transmission antennas in the horizontal direction and the vertical direction. In addition, it is desirable to make the DMRSs as signal vectors which are orthogonal between streams. In this case, space resources may be assumed as radio resources.

The precoding unit 27 performs an appropriate transmission power adjustment on the CSI-RS, without performing the precoding process, and then outputs it to the antenna unit 29.

In the antenna unit 29, first, the IFFT unit 29-1 applies inverse fast Fourier transform (IFFT) of $N_c$ points, or inverse discrete Fourier transform (IDFT) on the signal that is output from the corresponding precoding unit 27 so as to generate an OFDM signal having $N_c$ subcarriers, and inputs the OFDM signal to the GI insertion unit 29-2. Here, the description has been made assuming that the number of subcarriers and the number of points of IFFT are the same, but when a guard band is set in a frequency domain, the number of points is greater than the number of subcarriers. The GI insertion unit 29-2 gives a guard interval to the input OFDM signal, and inputs the signal to the wireless transmission unit 29-3. The wireless transmission unit 29-3 converts the input transmission signal of a baseband into a transmission signal of a radio frequency (RF) band, and inputs the transmission signal of the RF band to the antenna 29-5. The antenna 29-5 transmits the input transmission signal of the RF band.

[1.2. Terminal Apparatus 2]

Figure 6:
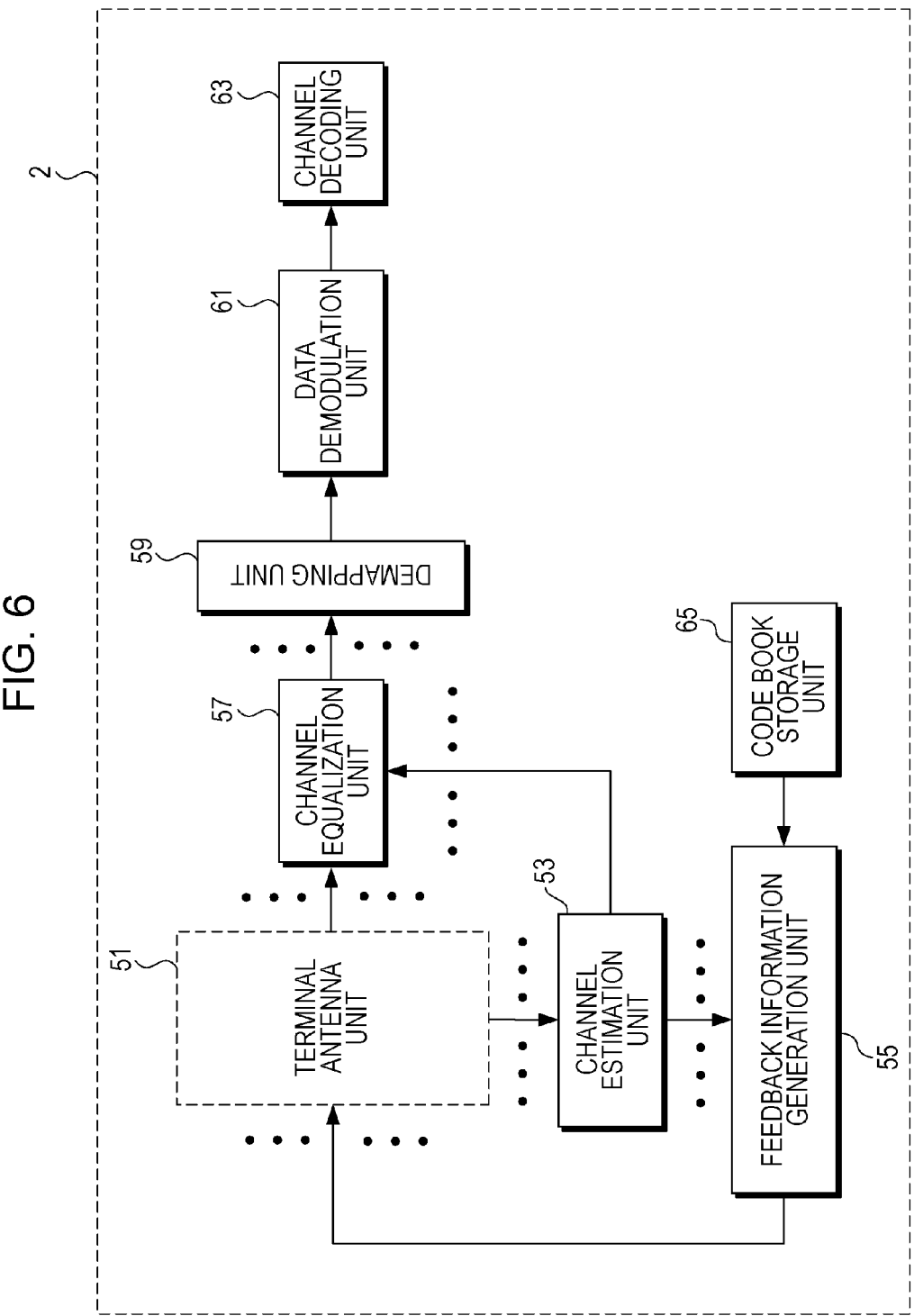
FIG. 6 is a block diagram illustrating a configuration of the terminal apparatus according to the first embodiment of the present invention.

FIG. 6 is a block diagram illustrating a configuration of the terminal apparatus 2 according to the first embodiment of the present invention. As illustrated in FIG. 6, the terminal apparatus 2 is configured to include a terminal antenna unit 51, a channel estimation unit 53, a feedback information generation unit 55, a channel equalization unit 57, a demapping unit 59, a data demodulation unit 61, a channel decoding unit 63, and a codebook storage unit 65. Among them, there are the terminal antenna units 51 of the number $N_r$ of reception antennas. However, in the following description, the number of reception antennas is assumed as $N_r=1$.

Figure 7:
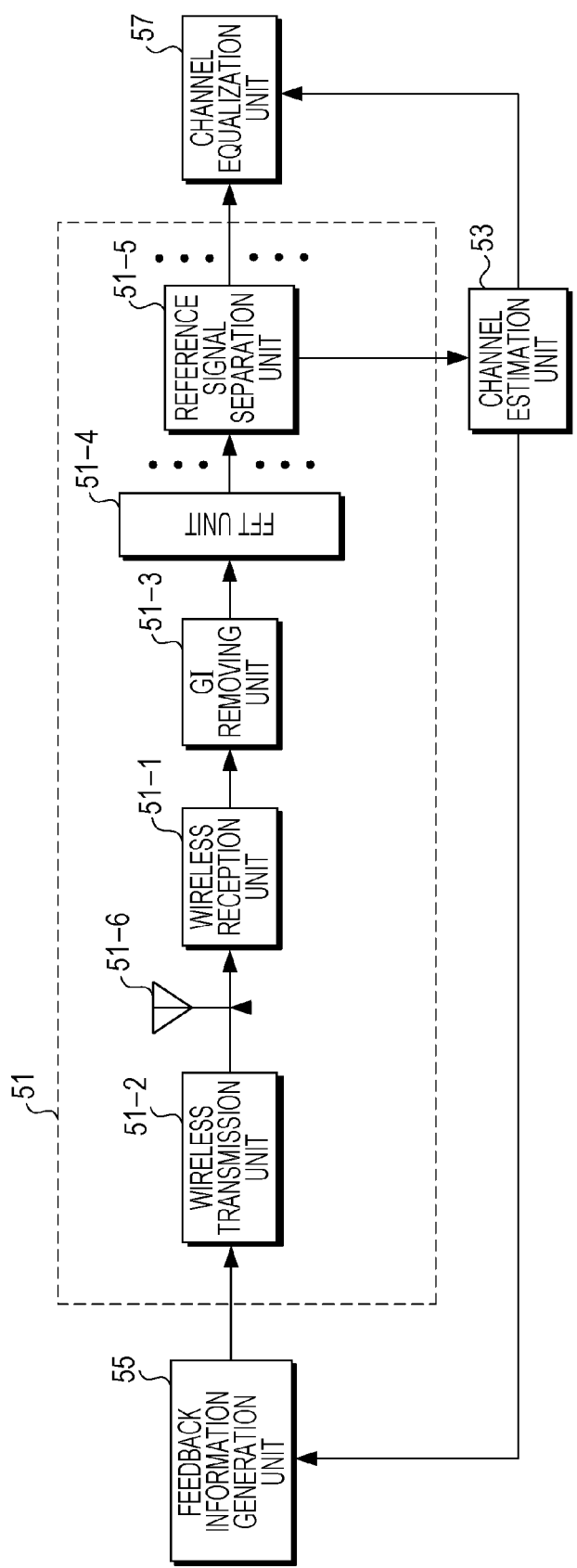
FIG. 7 is a block diagram illustrating a configuration of the terminal antenna unit 51 according to the first embodiment of the present invention.

FIG. 7 is a block diagram illustrating a configuration of the terminal antenna unit 51 according to the first embodiment of the present invention. As illustrated in FIG. 7, the terminal antenna unit 51 is configured to include a wireless reception unit 51-1, a wireless transmission unit 51-2, a GI removing unit 51-3, an FFT unit 51-4, a reference signal separation unit 51-5, and an antenna 51-6. The transmission signal that is transmitted from the base station apparatus 1 is first received at the antenna 51-6 of the terminal antenna unit 51, and then is input to the wireless reception unit 51-1. The wireless reception unit 51-1 converts the input signal into a baseband signal, and inputs the converted signal to the GI removing unit 51-3. The GI removing unit 51-3 removes a guard interval from the input signal, and inputs the processed signal to the FFT unit 51-4. The FFT unit 51-4 converts the input signal into $N_c$ subcarrier components by applying fast Fourier transform (FFT) or discrete Fourier transform (DFT) of $N_c$ points to the input signal, and then inputs the subcarrier components to the reference signal separation unit 51-5. The reference signal separation unit 51-5 separates the input signal into a data signal component, a CSI-RS component, and a DMRS component. The reference signal separation unit 51-5 inputs the data signal component to the channel equalization unit 57, and inputs the CSI-RS and the DMRS to the channel estimation unit 53. The signal processing to be described below will be basically performed for each subcarrier.

The channel estimation unit 53 performs channel estimation based on the CSI-RS and the DMRS which are input known reference signals. First, the channel estimation using the CSI-RS will be described.

Here, the CSI-RS is assumed to be transmitted from the first row antenna group and the first column antenna group which are assumed to be orthogonal, by the base station apparatus 1. In the following description, the CSI-RS that is transmitted from the antenna group in the horizontal direction, also including the first row antenna group, is referred to as a first CSI-RS. Further, the CSI-RS that is transmitted from the antenna group in the vertical direction, also including the first column antenna group, is referred to as a second CSI-RS.

The channel estimation unit 53 can estimate channel information between the first row antenna and the terminal apparatus 2, by using the first CSI-RS that is transmitted from the first row antenna. Here, since the number of antennas in the horizontal direction is 4 and the number of the reception antennas of the terminal apparatus 2 is 1, the channel information to be estimated is represented by a channel matrix of one row and four columns. This channel matrix is represented by $h_{H,1} = [h_{1,1}, h_{1,2}, h_{1,3}, h_{1,4}]$. Here, $h_{nV, nH}$ represents a complex channel gain between the antenna $(n_V, n_H)$ of the base station apparatus 1 and the terminal apparatus 2.

Meanwhile, the channel estimation unit 53 can estimate channel information between the first row antenna and the terminal apparatus 2, by using the second CSI-RS that is transmitted from the first column antenna. Here, since the number of antennas in the vertical direction is 4, the channel information to be estimated is represented by a channel matrix of one row and four columns. This channel matrix is represented by $h_{V,1} = [h_{1,1}, h_{2,1}, h_{3,1}, h_{4,1}]$.

The channel estimation unit 53 outputs the respective channel matrices $h_{H,1}$ and $h_{V,1}$ which are estimated based on the CSI-RS, to the feedback information generation unit 55. There is no limit to the specific channel estimation method. For example, channel estimation may be performed by a simple inverse modulation, based on the known reference signal sequence, or channel estimation utilizing the statistical properties of a channel such as two dimensional MMSE channel estimation may be performed. Further, the signal processing such as removing the effect of noise being applied to the CSI-RS by an interpolation process such as first-order linear interpolation or averaging process may be performed.

The feedback information generation unit 55 generates information associated with the desired linear filters W1 and W2 that are transmitted to the base station apparatus 1, based on $h_{H,1}$ and $h_{V,1}$ which are input from the channel estimation unit 53 and the codebook information stored in the codebook storage unit 65.

The codebook information stored in the codebook storage unit 65 is the same first codebook as the codebook information that is stored in the codebook storage unit 35 of the base station apparatus 1. In the present embodiment, the first codebook includes two codebooks: a second codebook and a third codebook. Then, the second codebook is associated with W1, and the third codebook is associated with W2.

The codebook describes a plurality of linear filters for each number of transmission antennas included in the base station apparatus 1, and for each number of transmission ranks of signals that the base station apparatus 1 transmits. In the present embodiment, there is no limit to the linear filters described in the second and third codebooks. For example, the codebook when the number of transmission antennas is 2, 4 and 8, which is adopted in LTE, may be used. In addition, the codebook itself of the number of transmission antennas of 8 which is adopted in LTE has a double codebook structure. In this case, in the present embodiment, the second codebook and the third codebook respectively may have the double codebook structure.

Further, the codebook may be generated by using a DFT matrix with the number of points as the number of transmission antennas. In this case, the number of linear filters described in the codebook may be increased and the chordal distance between linear filters may be reduced, by performing oversampling on the DFT matrix. However, it is desirable to set the chordal distance between respective linear filters to be the same.

Further, the codebook may be configured with a plurality of linear filters which are randomly generated. At this time, the generated codebook may be shared by the codebook storage unit 65 and the codebook storage unit 35. Here, it is desirable that each linear filter has the same norm.

Further, the codebook storage unit 65 and the codebook storage unit 35 may be controlled so as to periodically update the linear filter described in the codebook to another linear filter. Although the codebook may be updated by the base station apparatus 1 or the terminal apparatus 2, a control may be performed in such a manner that another apparatus (for example, a wireless network control station apparatus and the like) performs updating and the base station apparatus 1 and the terminal apparatus 2 download the updated codebook.

Further, the codebook storage unit 65 and the codebook storage unit 35 may use different codebooks, that is, the second codebook or the third codebook. For example, while the second codebook may be the DFT based codebook, the third codebook may be a random codebook. Of course, the second codebook and the third codebook may be the same codebook.

Further, the number of linear filters described in the second codebook and the number of linear filters described in the third codebook may be different. In addition, the numbers of linear filters respectively described in the second and third codebooks are the same, and the number of combinations of linear filters that the terminal apparatus 2 can notify the base station apparatus 1 may be controlled. The number of combinations of linear filters may be switched in association with the type (for example, a control signal and a data signal) or the transmission mode (for example, a MIMO transmission or a SISO transmission) of the transmission signal that is transmitted from the base station apparatus 1 to the terminal apparatus 2.

The feedback information generation unit 55 calculates linear filters suitable for $h_{H,1}$ and $h_{V,1}$ that are input from the channel estimation unit 53. There is no limit to the standard for determining a suitable linear filter in the present embodiment. For example, the feedback information generation unit 55 may select a linear filter having a maximum antenna gain (or reception signal-to-noise power ratio (SNR) or reception signal-to-interference plus noise power ratio (SINR)).

The linear filters described in the second and third codebooks are respectively $\{w_{1,b}, w_{2,b}; b=1 \text{ to } 2^B\}$. Here, $2^B$ is the number of linear filters described in the codebook, and B represents the number of bits related to the notification of the linear filter. The linear filters W1 and W2 having a maximum reception SNR are linear filters satisfying Equation (2).

[Equation 2]

$$\begin{cases} W_1 = \underset{w_{1,b}; b=1\sim 2^B}{\operatorname{argmax}} \|h_{H,1} w_{1,b}\|^2 \\ W_2 = \underset{w_{2,b}; b=1\sim 2^B}{\operatorname{argmax}} \|h_{V,1} w_{2,b}\|^2 \end{cases} \quad (2)$$

Further, when the number of transmission ranks becomes 2 or more, the channel capacity is calculated for each transmission rank and linear filter, and the number of transmission ranks and the linear filter having the highest channel capacity may be calculated.

Further, the feedback information generation unit 55 may calculate the linear filter W1 and the linear filter W2, over the entire subcarrier or in units of subbands obtained by collecting a plurality of subcarriers. Further, the feedback information generation unit 55 may calculate the linear filter in all OFDM symbols, or may periodically calculate the linear filter. In this case, the calculation periods of the linear filter W1 and the linear filter W2 may be the same or may be different.

The feedback information generation unit 55 outputs the control information associated with the calculated linear filters W1 and W2 (for example, the index of the linear filter $\{w_{1,b}, w_{2,b}; b=1 \text{ to } 2^B\}$) to the terminal antenna unit 51. In this case, the number of transmission ranks that maximizes the channel capacity, and control information associated with the reception quality such as the reception SNR and the channel capacity which are calculated by the feedback information generation unit 55 may be output to the terminal antenna unit 51. The periods in which the terminal apparatus notifies the base station apparatus 1 of the control information regarding W1 and the control information regarding W2 may be the same, or may be different periods, or a plurality of pieces of control information may be collectively transmitted.

By using the codebook of a double codebook structure, the terminal apparatus 2 can flexibly perform the notification of control information. When antennas not only in the horizontal direction but also in the vertical direction are disposed in the base station apparatus 1, the number of transmission antennas is larger as compared with the case of the arrangement only in the horizontal direction in the related art. Therefore, in the case of using the codebook of a single codebook structure, since the terminal apparatus 2 always needs to consider all transmission antennas, the operation amount related to the calculation for the appropriate linear filter, and the overhead for notification also increases. When the double codebook is the target of the present embodiment, it is sufficient for the terminal apparatus 2 to consider only the antenna group in the horizontal direction and the antenna group in the vertical direction, and thus an increase in the operation amount related to the calculation of the appropriate linear filter can be suppressed to the required minimum amount. Further, since the terminal apparatus 2 flexibly changes the period of notification of the linear filter W1 and the linear filter W2 depending on the channel environment, it is possible to suppress the overhead related to the notification.

The feedback information generation unit 55 inputs the generated signal to the wireless transmission unit 51-2 of the terminal antenna unit 51. The signal that is input to the wireless transmission unit 51-2 is converted into a signal suitable for transmission to the base station apparatus 1 and is input to the antenna 51-6 of the terminal antenna unit 51. The antenna 51-6 of the terminal antenna unit 51 transmits the input signal to the base station apparatus 1.

Next, the channel estimation that the channel estimation unit 53 performs on the DMRS will be described. The DMRS is used for estimating the channel estimation value that is required for the channel equalization performed by the channel equalization unit 57 which will be described later. Here, when the number of transmission ranks is 1 and p is transmitted as DMRS from a certain subcarrier, the reception signal $r_p$ is given by Equation (3).

[Equation 3]

$$\begin{cases} r_p = H(W_2 * W_1)p + n = gp + n \\ g = H(W_2 * W_1) \\ H = [h_{1,1}, h_{1,2}, \ldots, h_{4,3}, h_{4,4}] \end{cases} \quad (3)$$

Here, H denotes a channel matrix formed by arranging in order from the complex channel gain of the first row antenna group. n denotes the noise that is applied to the terminal apparatus 2. The channel estimation value that is required by the channel equalization unit 57 is an equivalent channel gain g constituted by the actual channel and the linear filter used by the precoding unit 27 of the base station 1.

In the present embodiment, there is no limit to the method by which the channel estimation unit 53 estimates g. For example, the channel estimation unit 53 may perform estimation by applying an inverse modulation on the reception signal, simply based on p, or may perform estimation based on the two-dimensional MMSE method and the like, based on the DMRS transmitted from a plurality of subcarriers. Further, similar to the channel estimation for the CSI-RS, the channel estimation unit 53 may use a noise suppression process such as interpolation and an averaging process for channel estimation for DMRS. The channel estimation unit 53 outputs the equivalent channel estimation value of each subcarrier which is estimated, to the channel equalization unit 57.

A data signal component that is output from the reference signal separation unit 51-5 and an equivalent channel estimation value that is input from the channel estimation unit 53 are input to the channel equalization unit 57. The channel equalization unit performs a channel equalization process on the input reception signal based on the equivalent channel estimation value.

In the present embodiment, there is no limit to the method of the channel equalization process performed by the channel equalization unit 57. For example, in the case of rank 1 transmission as assumed in the foregoing description, the channel equalization unit 57 may perform synchronous detection on the reception signals, based on the equivalent channel estimation value. Further, when the number of transmission ranks is 2 or more, the channel equalization unit 57 may apply a spatial filtering of minimum mean square error (MMSE) or Zero forcing (ZF) norm to the reception signal, based on the equivalent channel estimation value, or may apply a non-linear signal process which is represented by the maximum likelihood detection and successive interference canceller, and the like. The channel equalization unit 57 outputs the signal subjected to the channel equalization to the demapping unit 59.

In the demapping unit 59, the terminal apparatus 2 extracts transmission data addressed to the terminal apparatus 2, from the radio resource used for the transmission of the transmission data addressed to the terminal apparatus 2. In addition, it may be configured such that the output of the reference signal separation unit 51-5 is first input to the demapping unit 59, and only the radio resource component corresponding to the terminal apparatus 2 is input to the channel equalization unit 57. Thereafter, the output of the demapping unit 59 is input to the data demodulation unit 61 and the channel decoding unit 63, and data demodulation and channel decoding are performed.

In the present embodiment, the OFDM signal transmission is assumed, and the precoding is assumed to be performed for each subcarrier, but there is no limit to the transmission method (or an access scheme) and the application units of the precoding. For example, the present embodiment can be applied to the case of performing precoding for each resource block obtained by collecting a plurality of subcarriers, and similarly, the present embodiment can be applied to a single carrier based access scheme (for example, a single carrier frequency division multiple access (SC-FDMA) scheme and the like).

The method that is described above enables realizing the codebook-based MIMO transmission in a wireless communication system in which antennas are arranged not only in the horizontal direction but also in the vertical direction in the base station apparatus 1. Further, since the codebook for using the notification of the linear filter has the double codebook structure, the terminal apparatus 2 can suppress the operation amount related to the calculation for the appropriate linear filter and the overhead related to the notification to the base station apparatus 1, and this can contribute the improvement of the frequency use efficiency of the entire wireless communication system.

2. Second Embodiment

The first embodiment targets 3D-MIMO transmission in the wireless communication system in which the base station apparatus 1 and the terminal apparatus 2 can use a common double codebook. However, in LTE which is the next generation wireless communication standard, securing the backward compatibility is one of important issues. In other words, in the future, a situation is considered in which the base station apparatus 1, the terminal apparatus 2 that can recognize antennas arranged in the vertical direction, and the terminal apparatus 3 incapable of recognizing antennas arranged in the vertical direction coexist.

Figure 8:
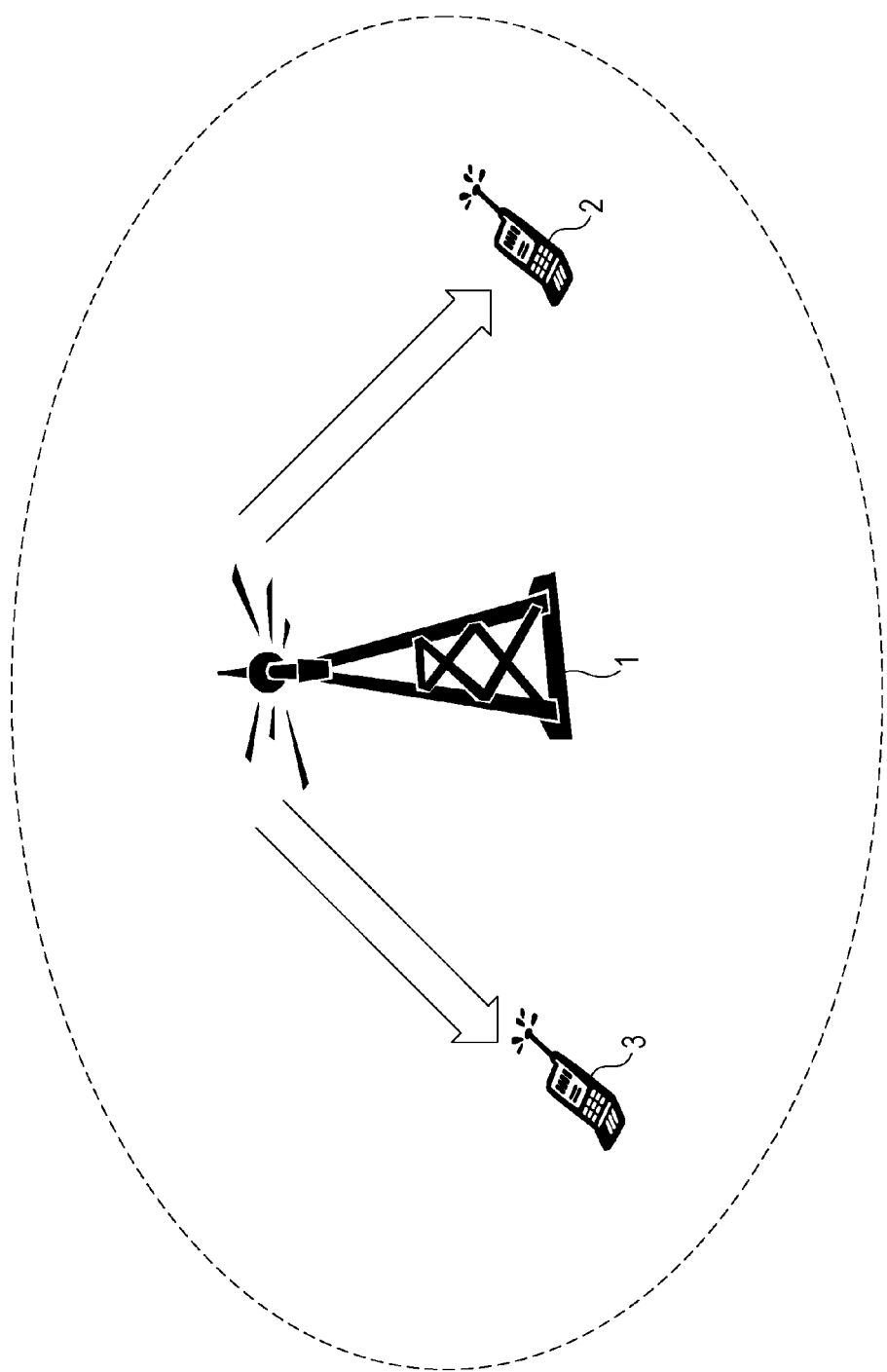
FIG. 8 is a diagram illustrating an overview of a wireless communication system according to a second embodiment of the present invention.

FIG. 8 is a diagram illustrating an overview of a wireless communication system according to a second embodiment of the present invention. The second embodiment targets a circumstance where the terminal apparatus 2 having $N_r$ reception antennas and the terminal apparatus 3 having similarly $N_r$ reception antennas are connected to the base station apparatus 1 having $N_t$ transmission antennas. The terminal apparatus 2 is substantially the same as the terminal apparatus 2 which is targeted in the first embodiment. Meanwhile, the terminal apparatus 3 is a legacy terminal apparatus that cannot understand the antenna in the vertical direction which is arranged in the base station apparatus 1. In addition, unless the radio parameters such as the number of transmission ranks are not particularly specified, the radio parameters are assumed to be the same as in the first embodiment.

[2.1. Base Station Apparatus 1]

The configuration of the base station apparatus 1 according to the second embodiment of the present invention is the same as in FIG. 3. However, the signal processing in the mapping unit 25, the precoding unit 27, the codebook storage unit 35, and the channel information acquisition unit 33 is the same as in the first embodiment. In the following description, the signal processing in the base station apparatus 1 will be described focusing on the signal processing in these configuration components.

First, a signal processing in the mapping unit 25 will be described. Similar to the first embodiment, the mapping unit 25 performs mapping for arranging a data signal, a DMRS, and a CSI-RS to appropriate radio resources.

The mapping unit 25 maps the data signal addressed to the terminal apparatus 2 and the data signal addressed to the terminal apparatus 3 to radio resources which are orthogonal to each other. In the present embodiment, there is no limit to the mapping method. For example, the mapping unit 25 map perform mapping of a data signal addressed to each terminal apparatus, by using a scheduling technology such as Proportional Fairness, based on the reception quality of which notification is sent from each terminal apparatus.

The mapping unit 25 maps the DMRS addressed to the terminal apparatus 2 and the DMRS addressed to the terminal apparatus 3 to radio resources which are orthogonal to each other. When the base station apparatus 1 performs transmission of transmission rank 2 or more addressed to each terminal apparatus, the mapping unit 25 maps the DMRS associated with each data stream to radio resources which are orthogonal to each other.

Next, the mapping of CSI-RS will be described. Similar to the first embodiment, also in the present embodiment, the CSI-RS may be transmitted by using radio resources which are orthogonal to each other, from all of the transmission antennas. However, it is already described in the first embodiment that control performed in this manner increases the overhead due to the transmission of the reference signal. Thus, also in the present embodiment, as described below, it may be controlled so as to transmit the first CSI-RS and the second CSI-RS independently.

In this case, the base station apparatus 1 transmits the first CSI-RS associated with the antenna group in the horizontal direction and the second CSI-RS associated with the antenna group in the vertical direction. However, the terminal apparatus 3 which is the legacy terminal apparatus cannot distinguish the first CSI-RS and the second CSI-RS.

Here, the terminal apparatus 3 which is the legacy terminal apparatus is assumed to communicate with the base station apparatus 1 in which antennas are arranged only in the horizontal direction. For example, it is assumed that the terminal apparatus 3 is a terminal apparatus conforming to the specification up to LTE Release 11, or a terminal apparatus conforming to the specification of wireless LAN such as 802.11n and 802.11ac. The mapping unit 25 maps the first CSI-RS to radio resources that is recognizable by the terminal apparatus 3 which is the legacy terminal apparatus.

For example, in the present embodiment, the number of antennas of the antenna group in the horizontal direction is four. Thus, when the base station apparatus 1 has four antennas only in the horizontal direction, the first CSI-RS may be arranged in the radio resources in which the CSI-RS has been mapped.

For example, in LTE Release 10, a mapping method of the CSI-RS when two, four and eight antennas are arranged only in the horizontal direction is defined. In the present embodiment, the mapping unit 25 may map the first CSI-RS based on the mapping method of the CSI-RS that is defined in LTE Release 10. Further, the mapping unit 25 may map the first CSI-RS based on the mapping method of the reference signal that is defined in 802.11n, 802.11ac, and the like.

In addition, the first CSI-RS is the CSI-RS associated with the antenna group in the horizontal direction, but there are plurality of antenna groups in the horizontal direction. The mapping unit 25 may always transmit the first CSI-RS from the same antenna group in the horizontal direction, and may periodically change the antenna group from which the CSI-RS is transmitted.

In addition, as described above, even when it may be controlled that the base station apparatus 1 transmits the CSI-RS by using the radio resources which are orthogonal to each other, from all of the transmission antennas, it is desirable that a portion of CSI-RSs are transmitted from the radio resources that is recognizable by the terminal apparatus 3 which is a legacy terminal apparatus.

Meanwhile, the mapping unit 25 maps the second CSI-RS to the radio resource which is orthogonal to the first CSI-RS. The mapping method may be the same as in the first embodiment. In addition, the second CSI-RS is not recognizable by the terminal apparatus 3 which is a legacy terminal apparatus. Therefore, in the case of the wireless communication system in which the base station apparatus 1 transmits the CSI-RS only from the radio resources associated with the radio resources to which the data signal addressed to each terminal apparatus is allocated, it may be controlled that the mapping unit 25 does not transmit the second CSI-RS to the terminal apparatus 3. Hitherto, the signal processing in the mapping unit 25 in the present embodiment has been described.

Next, the signal processing in the codebook storage unit 35 and the channel information acquisition unit 33 will be described. Similar to the first embodiment, the codebook storage unit 35 includes a codebook of a double codebook structure. The codebook is shared with the terminal apparatus 2. Further, differently from the first embodiment, the codebook storage unit 35 further includes a codebook that is recognizable by the terminal apparatus 3 which is the legacy terminal apparatus. In this case, among codebooks of the double codebook structure recognized by the terminal apparatus 2, the same codebook as the codebook (also referred to as a fourth codebook) that is recognizable by the terminal apparatus 3 or respective different codebooks may be used as the second codebook associated with the antenna in the horizontal direction. However, using the same codebook enables suppressing the number of codebooks that should be stored in the codebook storage unit 35.

Similar to the first embodiment, the channel information acquisition unit 33 can acquire the linear filters W1 and W2 that are desirably applied to the data signal addressed to the terminal apparatus 2, from the control information associated with the first linear filter and the second linear filter of which notification is sent from the terminal apparatus 2.

Meanwhile, although details will be described later, since the terminal apparatus 3 which is a legacy terminal apparatus cannot recognize the antenna group in the vertical direction, the terminal apparatus 3 notifies the base station apparatus 1 only of control information associated with a third linear filter W3 which is aligned with the antenna group in the horizontal direction. Therefore, the channel information acquisition unit 33 can acquire the linear filter W3 that is desirably applied to the data signal addressed to the terminal apparatus 3. In other words, while the channel information acquisition unit 33 outputs the two linear filters W1 and W2 to the precoding unit 27, as the linear filters that are desirably applied to the data signal addressed to the terminal apparatus 2, the channel information acquisition unit 33 outputs only W3 to the precoding unit 27, as the linear filter that is desirably applied to the data signal addressed to the terminal apparatus 3.

Finally, the signal processing in the precoding unit 27 will be described. Since the precoding processing that the precoding unit 27 performs on the data signal addressed to the terminal apparatus 2 is the same as in the first embodiment, the description thereof will be omitted. Meanwhile, with respect to the precoding processing performed on the data signal addressed to the terminal apparatus 3, the precoding unit 27 recognizes only the linear filter W3 associated with the antenna group in the horizontal direction.

Thus, the precoding unit 27 performs precoding on the data signal addressed to the terminal apparatus 3, assuming that the base station apparatus 1 includes only one set of antenna group in the horizontal direction. There is no limit to the precoding method. For example, in the case of rank 1 transmission, if the linear filter W3 associated with a certain subcarrier $h_{v,1}$ of which notification is sent from the terminal apparatus 3, the precoding unit 27 performs precoding of s=W1×d on the data signal d transmitted from the corresponding subcarrier. Thus, the precoding unit 27 is controlled so as to transmit the precoded transmission signal vector from any one set of the antenna groups in the horizontal direction. The antenna groups that transmit the transmission signal vectors may be always the same or periodically changed, or the same transmission signal vector may be transmitted from all of the antenna groups. Further, it may be controlled that the precoding unit 27 performs open-loop type transmission diversity such as cyclic shift diversity, between antenna groups in the vertical direction, based on the transmission signal vector. In any case, the precoding unit 27 performs precoding described above also on the data signal addressed to the terminal apparatus 3 so as to determine the transmission signal of all of the transmission antennas. Of course, the transmission signal contains a null signal that is not actually transmitted. The precoding unit 27 outputs the generated transmission signal vector to the antenna unit 29.

Since the signal processing in other configuration components of the base station apparatus 1 in the present embodiment is the same as in the first embodiment, the description thereof will be omitted.

[2.2. Terminal Apparatus 3]

Since the configuration and the signal processing of the terminal apparatus 2 in the present embodiment are the same as in the first embodiment, the description thereof will be omitted. In the following description, the configuration and the signal processing of terminal apparatus 3 which is the legacy terminal apparatus will be described.

Figure 9:
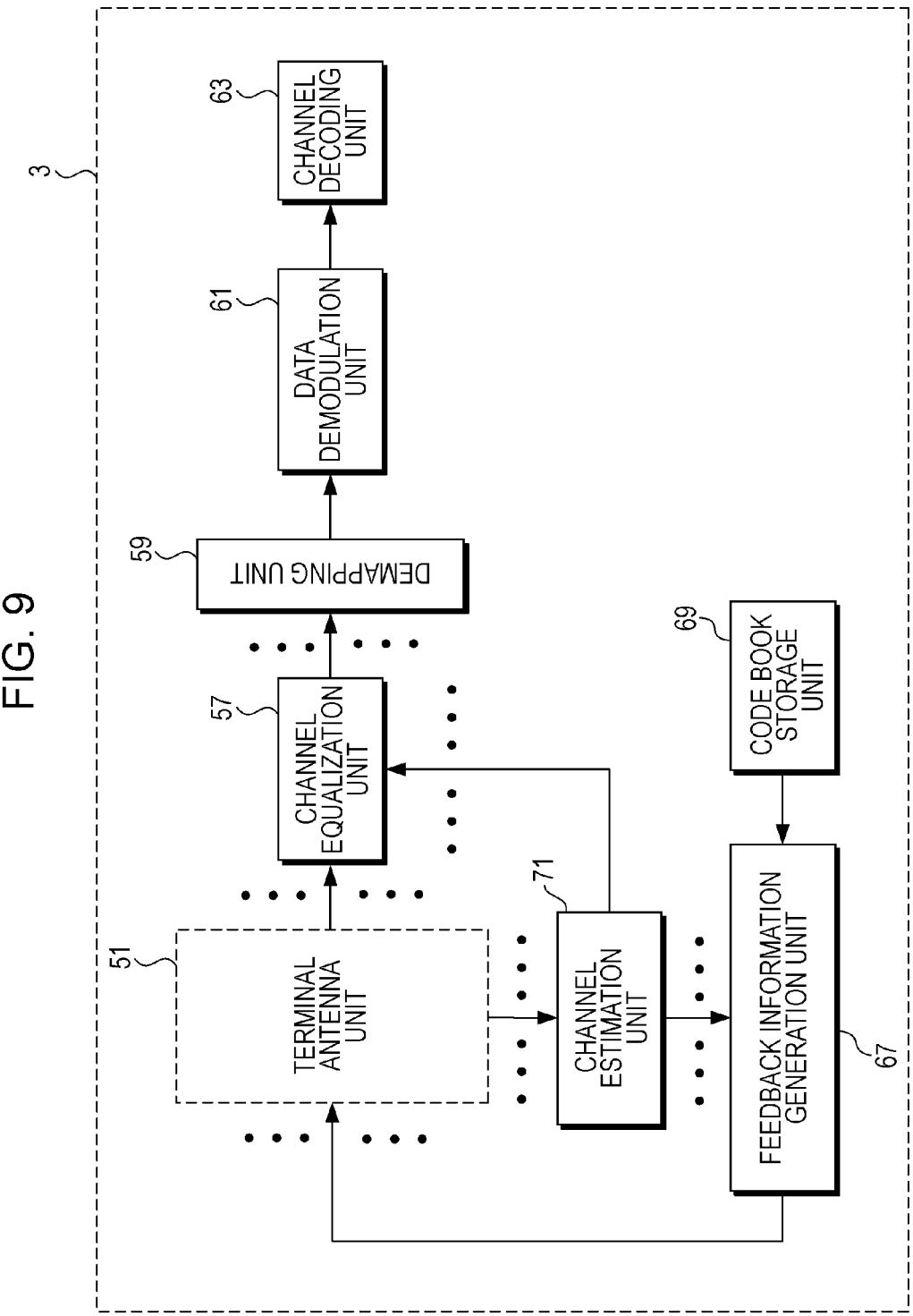
FIG. 9 is a block diagram illustrating a configuration of a terminal apparatus according to the second embodiment of the present invention.

FIG. 9 is a block diagram illustrating a configuration of the terminal apparatus 3 in the present embodiment. The configuration of the terminal apparatus 3 is substantially the same as that of the terminal apparatus 2, except for a feedback information generation unit 67, a codebook storage unit 69, and a channel estimation unit 71. In the following description, the signal processing in the feedback information generation unit 67, the codebook storage unit 69, and the channel estimation unit 71 will be described.

The signal processing in the channel estimation unit 71 will be described. Similar to the terminal apparatus 2, the reference signal associated the DMRS and the CSI-RS that are output from the reference signal separation unit 51-5 are input to the channel estimation unit 71. Here, the channel estimation performed by the channel estimation unit 53 based on the DMRS is the same as in the terminal apparatus 2. However, when the precoding unit 27 in the base station apparatus 1 uses an open-loop type transmission diversity, based on the transmission signal vector addressed to the terminal apparatus 3, the channel estimation unit 71 needs to perform estimation of an equivalent channel gain considering the situation. Therefore, the channel estimation unit 71 does not need to recognize the open-loop type transmission diversity employed by the precoding unit 27. The channel estimation unit 71 outputs the equivalent channel gain estimated based on the DMRS, to the channel equalization unit 57.

Next, the channel estimation method will be described based on the CSI-RS in the channel estimation unit 71. Since the terminal apparatus 3 can recognize only the first CSI-RS, the channel estimation unit estimates the channel gain associated with the antenna group in the horizontal direction from which the first CSI-RS is transmitted. In this case, the channel estimation unit 71 may not recognize an antenna group in the horizontal direction from which the CSI-RS is transmitted. In the following description, it is assumed that the base station apparatus 1 transmits the first CSI-RS from the first row antenna group. Then, the channel estimation unit 71 outputs the channel information $h_H$ that is estimated based on the first CSI-RS, to the feedback information generation unit 67.

The feedback information generation unit 67 calculates a linear filter W3 suitable for $h_H$ that is input from the channel estimation unit 71 and the codebook (referred to as the fourth codebook) stored in the codebook storage unit 69. There is no limit to the standard for determining a suitable linear filter in the present embodiment, similar to the terminal apparatus 2. For example, a linear filter having a maximum antenna gain (or SNR or SINR) may be selected.

The linear filters described in the codebooks stored in the codebook storage unit 69 of the terminal apparatus 3 is $\{w_{3,b}; b=1 \text{ to } 2^B\}$. Here, $2^B$ is the number of linear filters described in the codebook, and B is the number of bits related to the notification. In addition, the number B of bits related to the notification may be different between the terminal apparatus 2 and the terminal apparatus 3. The linear filter W3 having a maximum reception SNR is a linear filter satisfying Equation (4).

[Equation 4]

$$W_3 = \underset{w_{3,b}; b=1\sim 2^B}{\operatorname{argmax}} \|h_H w_{3,b}\|^2 \qquad (4)$$

Further, when the number of transmission ranks becomes 2 or more, the channel capacity is calculated for each transmission rank and linear filter, and the number of transmission ranks and the linear filter having the highest channel capacity may be calculated. The feedback information generation unit 67 inputs the generated signal to the wireless transmission unit 51-2 of the terminal antenna unit 51.

The signal processing in other configuration components of the terminal apparatus 3 is the same as in the terminal apparatus 2, the description thereof will be omitted.

The second embodiment targets a wireless communication system in which the terminal apparatus 3 which is a legacy terminal apparatus that can recognize only the antenna group in the horizontal direction and the terminal apparatus 2 that can recognize also the antenna group in the vertical direction coexist. According to the present embodiment, the terminal apparatus 3 also can be connected to the base station apparatus 1 equipped with the antenna group in the vertical direction, and thus it is possible to maintain backward compatibility. Further, among the double codebooks that the terminal apparatus 2 recognizes, the second codebook associated with the antenna group in the horizontal direction and the codebook that the terminal apparatus 3 recognizes are common, and thus it is possible to reduce the burden of the codebook storage unit 35 of the base station apparatus 1.

3. Third Embodiment

The first and second embodiments target the wireless communication system that performs SU-MIMO. However, when the base station apparatus includes a plurality of transmission antennas, it is possible to perform downlink MU-MIMO transmission in which data signals addressed to a plurality of terminal apparatuses are spatially multiplexed and simultaneously transmitted. The third embodiment targets a wireless communication system in which the base station apparatus and a plurality of terminal apparatuses perform the downlink MU-MIMO transmission.

Figure 10:
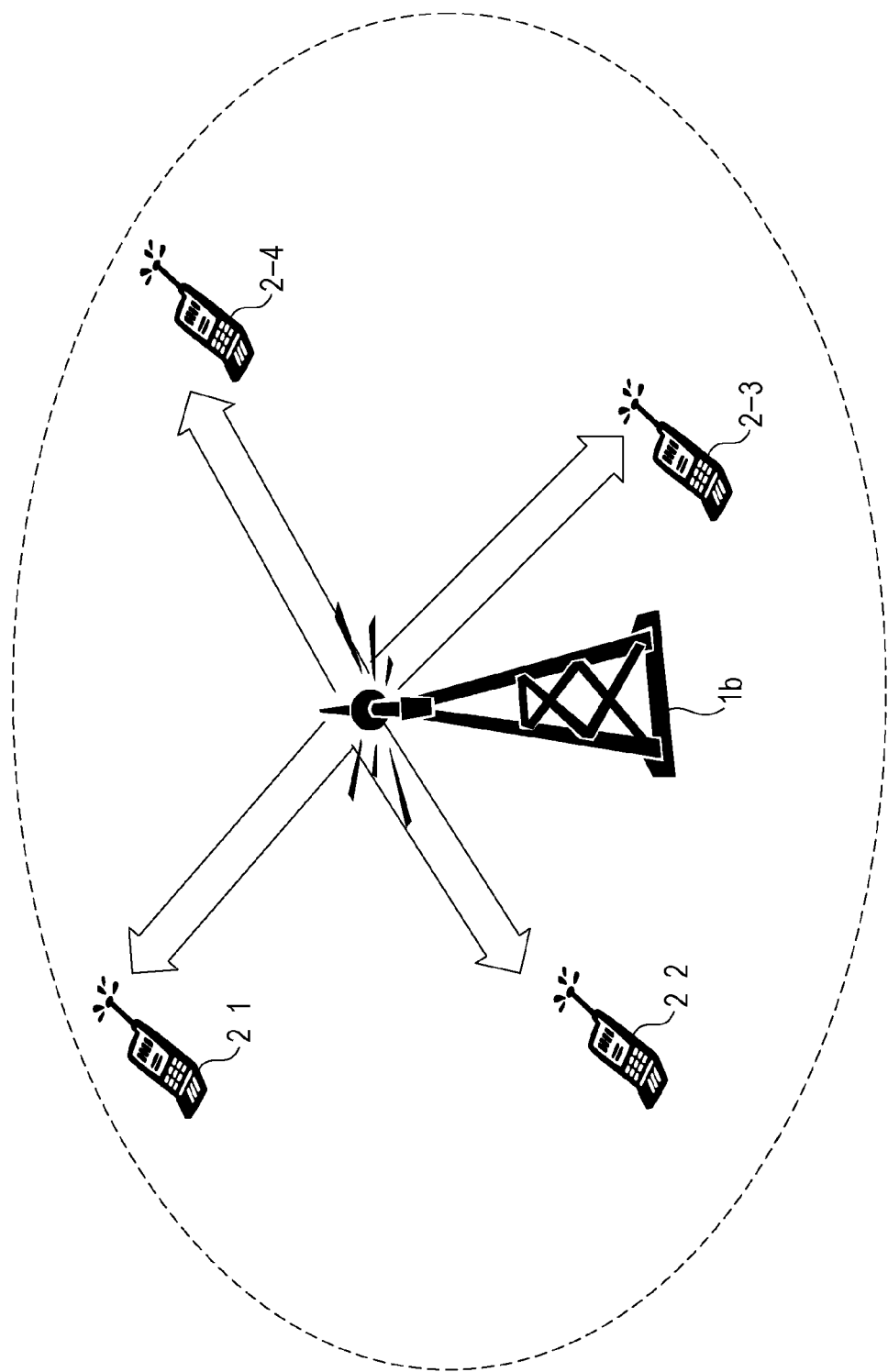
FIG. 10 is a diagram illustrating an overview of a wireless communication system according to a third embodiment of the present invention.

FIG. 10 is a diagram illustrating an overview of the wireless communication system according to the third embodiment of the present invention. The third embodiment targets a wireless communication system in which U (in FIG. 10, four terminal apparatuses 2-1 to 2-4) terminal apparatuses 2 each having $N_r$ reception antennas are connected to a base station apparatus 1b having $N_t$ transmission antennas at the same time. In addition, unless the radio parameters such as the number of transmission ranks are not particularly specified, the radio parameters are assumed to be the same as in the first embodiment and the second embodiment.

Since the signal processing of the terminal apparatus 2 in the third embodiment is the same as in the first and second embodiments, the description thereof will be omitted. In the following description, the signal processing of the base station apparatus 1b in the present embodiment will be described.

[3.1. Base Station Apparatus 1b]

Figure 11:
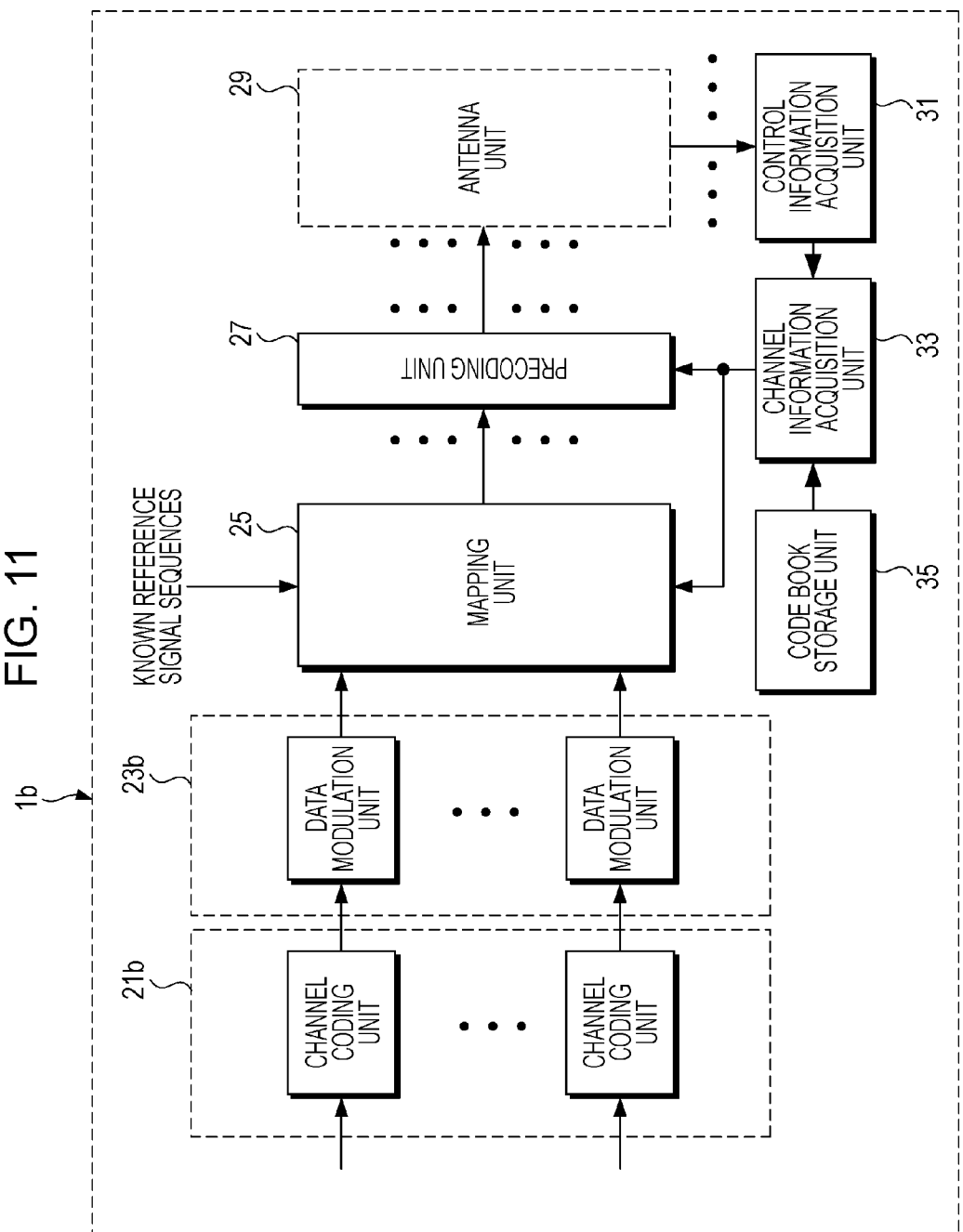
FIG. 11 is a diagram illustrating a configuration of a base station apparatus according to the third embodiment of the present invention.

FIG. 11 is a block diagram illustrating a configuration of the base station apparatus 1b according to the third embodiment of the present invention. Although the specific configuration thereof is the same as the configuration of the base station apparatus 1 according to the first and second embodiments, there are channel coding units 21b and data modulation unit 23b of U number of terminal apparatuses 2 which are simultaneously connected to the channel coding unit 21 and the data modulation unit 23 included in the base station apparatus 1.

First, after the channel coding unit 21b performs channel coding on a transmission data sequence addressed to the terminal apparatus 2, the data modulation unit 23b performs digital data modulation such as QPSK and 16QAM. The data modulation unit 23b inputs the data signal subjected to the data modulation, to the mapping unit 25.

Next, the mapping unit 25 maps the data signal address to each terminal apparatus 2 that is input from the data modulation unit 23 to appropriate radio resources. Although it is basically assumed that one terminal apparatus 2 occupies one subcarrier in the first and second embodiment, the base station apparatus 1b can transmit the data signals addressed to a plurality of terminal apparatuses 2 in one subcarrier, in the present embodiment. In other words, the space resources included in a certain subcarrier are shared by a plurality of terminal apparatuses 2. The base station apparatus 1b determines the mapping to actual radio resources, depending on the reception quality or the like of which notification is sent from each terminal apparatus 2.

Since the mapping method of the CSI-RS in the mapping unit 25 is the same as in the first and second embodiment, the description thereof will be omitted. Meanwhile, the mapping method of the DMRS in the mapping unit 25 is the same as in the first and second embodiment, except for that multiplexing is needed by using radio resources which are orthogonal between a plurality of terminal apparatuses 2 simultaneously connected to the base station apparatus 1b.

Further, the control information acquisition unit 31 acquires control information of which notification is sent from the plurality of connected terminal apparatuses 2 outputs control information associated with the first and second linear filters among the control information pieces, to the channel information acquisition unit 33.

The channel information acquisition unit 33 acquires a first linear filter W1 and a second linear filter W2 which are required by each terminal apparatus 2, based on control information that is input from the control information acquisition unit 31 and the codebook information stored in the codebook storage unit 35, and outputs the acquired linear filters to the precoding unit 27.

Next, the signal processing in the precoding unit 27 will be described. In the codebook-based MU-MIMO transmission in the related art, the base station apparatus 1b forms an equivalent channel matrix, based on the desired linear filter of which notification is sent from each terminal apparatus 2, and calculates the precoding filter $W_p$ based on the MMSE norms or the ZF norms, based on the channel matrix. Thus, the base station apparatus 1b calculates a transmission signal vector by multiplexing the calculated $W_p$ to the transmission data vector configured with the transmission data addressed to each terminal apparatus 2.

Even in the present embodiment, it is possible to realize the MU-MIMO transmission by using the same method as in the related art. For example, the first and second linear filters, of which notification is sent from the terminal apparatus 2-u, are assumed as W1-u and W2-u, the linear filters which are actually multiplied to the data signal are represented by (W2-u*W1-u) (see Equation (1)). Thus, the precoding unit 25 can calculate the precoding filter $W_p$ based on the MMSE norms or the ZF norms, based on the channel matrix made by arranging the Hermitian matrix of (W2-u*W1-u) which is the linear filters multiplied to the data signal of each terminal apparatus 2 in the row direction.

However, in the present embodiment, the notification of the desired linear filter W1 associated with the antenna group in the horizontal direction and the desired linear filter W2 associated with the antenna group in the vertical direction is sent from each terminal apparatus 2. The precoding may be performed focusing the above fact.

For example, in the present embodiment, there are four antenna groups in the horizontal direction. Thus, the base station apparatus 1b can spatially multiplex at maximum four terminal apparatuses 2 by using only the antenna group in the horizontal direction. Specifically, the precoding unit 25 can calculate the precoding filter $W_p$ based on the MMSE norms or the ZF norms, based on the channel matrix made by arranging only the linear filter W1-u of which notification is sent from each terminal apparatus 2 in the row direction. The precoding unit 25 can calculate a transmission signal vector by multiplexing the calculated precoding filter $W_p$ to the transmission data vector configured with the transmission data addressed to each terminal apparatus 2. The precoding unit 25 may be controlled so as to transmit the calculated transmission signal vector from any antenna group in the horizontal direction, or may be controlled so as to transmit the calculated transmission signal vector from all of the antenna groups in the horizontal direction.

Further, the precoding unit 25 may be controlled so as to multiply in advance the linear filter W2 of which notification is sent from each terminal apparatus 2 to the transmission data addressed to each terminal apparatus 2 and then perform the precoding described above. This is because since the inter-user interference can already be suppressed by the antenna gain of the antenna group in the horizontal direction, the precoding unit 25 may perform the precoding for the transmission data addressed to each terminal apparatus 2 transmitted from the antenna group in the vertical direction may be performed independently for each terminal apparatus 2.

In the above description, it is assumed that the inter-user interference is suppressed due to the antenna gain of the antenna group in the horizontal direction, but the precoding unit 25 may suppress the suppression of user interference due to the antenna gain of the antenna group in the vertical direction. In other words, the precoding unit 25 may be controlled so as to calculate the precoding filter $W_p$, based on the W2-u of which notification is sent from each terminal apparatus 2. Of course, the precoding unit 25 may be controlled so as to multiply in advance the linear filter W1 of which notification is sent from each terminal apparatus 2 to the transmission data addressed to each terminal apparatus 2 and then perform the precoding.

In addition, the precoding method that has been described above is a linear precoding, but the precoding unit 25 may apply non-linear pre-coding represented by Tomlinson-Harashima precoding and Vector perturbation. In this case, since the data signal that is added to the signal called a perturbation vector is transmitted, the terminal unit 2 needs to perform a signal processing (for example, modulo operation and the like) in consideration of the perturbation vector that is added to the data signal, on the reception signal. In addition, the precoding unit 25 may perform the non-linear pre-coding on the data signal even in other embodiments.

In order to suppress inter-user interference with high efficiency by the antenna gain of the antenna group in the horizontal direction and the vertical direction, it is desirable that the channels of the terminal apparatus 2 to be spatially multiplexed are orthogonal. For example, it is undesirable to spatially multiplex the terminal apparatuses 2 with each other that have transmitted the same desired linear filter. Thus, the mapping unit 25 in the present embodiment may perform control in such a manner that the combination of the terminal apparatuses 2 to be spatially multiplexed is a combination capable of suppressing the inter-user interference with high efficiency, for the data signal addressed to each terminal apparatus 2. For example, the mapping unit 25 may map the data signal so as to spatially multiplex the terminal apparatuses 2 in such a manner that the value of the determinant of the precoding filter $W_p$ calculated in the precoding unit 27 is as close to 1 as possible.

The precoding unit 25 outputs each of the transmission signal vectors obtained by performing the precoding process on the data signal addressed to each terminal apparatus 2, to the antenna unit 29. Since the configuration of the antenna unit 29 and the signal processing performed in each configuration component are the same as in the first and second embodiments, the description thereof will be omitted.

The present embodiment targets a wireless communication system which performs MU-MIMO transmission in which a plurality of terminal apparatuses 2 are simultaneously connected to the base station apparatus 1b including antennas in the horizontal direction and the vertical direction. According to the present embodiment, since it is possible to perform MU-MIMO transmission with high efficiency between the base station apparatus 1b and the plurality of terminal apparatuses 2 that share the codebook having a double codebook structure, it is possible to significantly improve the frequency use efficiency of the wireless communication system.

4. Fourth Embodiment

In the third embodiment, it is assumed that the terminal apparatus connected to the base station apparatus 1b is the terminal apparatus 2 capable of considering all of the antenna gains in the vertical direction included in the base station apparatus 1. The fourth embodiment targets a wireless communication system that performs MU-MIMO transmission in which a plurality of terminal apparatuses 3 which are legacy terminal apparatuses without considering the antenna gains in the vertical direction included in the base station apparatus 1b, in addition to the plurality of terminal apparatuses 2, are simultaneously connected to the base station apparatus 1, related to the second embodiment.

Figure 12:
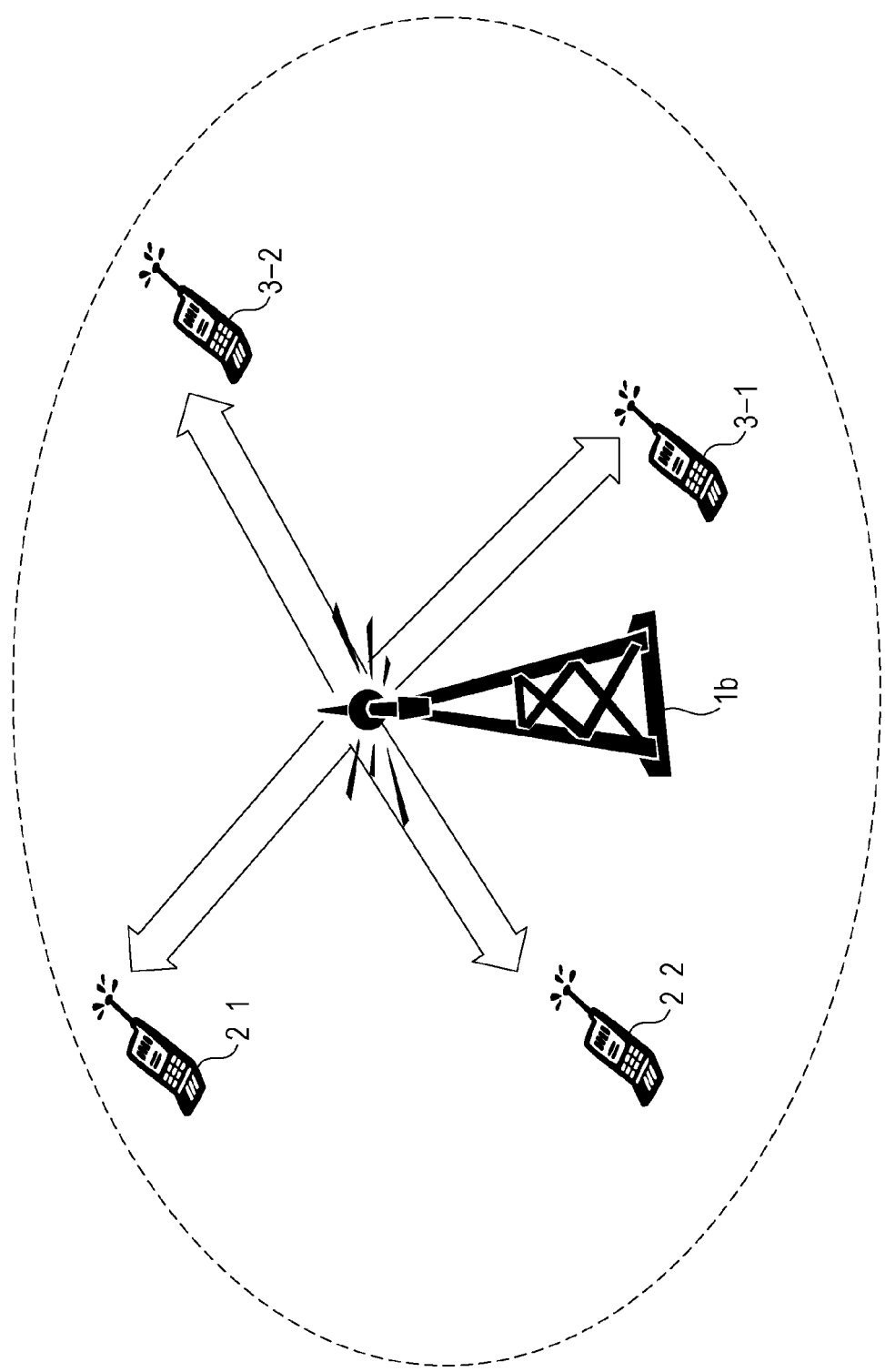
FIG. 12 is a diagram illustrating an overview of a wireless communication system according to a fourth embodiment of the present invention.

FIG. 12 is a diagram illustrating an overview of the wireless communication system according to the third embodiment of the present invention. The third embodiment targets a wireless communication system in which a plurality of (in FIG. 12, two terminal apparatuses 2-1 to 2-2) terminal apparatuses 2 each having $N_r$ reception antennas and a plurality of (in FIG. 12, two terminal apparatuses 3-1 to 3-2) terminal apparatuses 3 each having $N_r$ reception antennas are connected to the base station apparatus 1b having $N_t$ transmission antennas at the same time. In addition, unless the radio parameters such as the number of transmission ranks are not particularly specified, the radio parameters are assumed to be the same as in the first embodiment, Since the signal processing of the terminal apparatus 2 and the terminal apparatus 3 in the fourth embodiment are the same as in the second embodiment, the description thereof will be omitted. In the following description, the signal processing of the base station apparatus 1b in the present embodiment will be described.

[4.1. Base Station Apparatus 1b]

The configuration of the base station apparatus 1b according to the fourth embodiment is the same as in FIG. 11. The signal processing in each configuration component is the same as in the second and third embodiments, except for the signal processing of the precoding unit 27.

The precoding unit 27 performs precoding on the data signal addressed to each of the terminal apparatus 2 and the terminal apparatus 3, based on the desired linear filters of which notification is sent from each of the terminal apparatus 2 and the terminal apparatus 3. It is different from the third embodiment in that the notification of only the third linear filter associated with the antenna group in the horizontal direction included in the base station apparatus 1b is sent from the terminal apparatus 3.

Thus, the precoding unit 27 calculates the precoding filter $W_p$, based on the channel matrix made by arranging the Hermitian transpose matrix of the W1 of which notification is sent from each terminal apparatus 2 and W3 of which notification is sent from each terminal apparatus 3, in the row direction. Then, the precoding unit 27 calculates the transmission signal vector by multiplying the precoding filter $W_p$ to the data signal vector configured with the data signals addressed to the terminal apparatuses 2-1 to 2-2 and the terminal apparatuses 3-1 to 3-2.

The precoding unit 27 may be controlled so as to transmit the calculated transmission signal vector from any antenna group in the horizontal direction, or so as to transmit it from all of the antenna groups in the horizontal direction.

Further, similar to the third embodiment, the inter-user interference can be suppressed in advance, by the antenna gain of the antenna group in the horizontal direction, by the precoding processing described above even in the present embodiment. Accordingly, the precoding for multiplying W2 that is the desired linear filter associated with the antenna group in the vertical direction may be performed in advance, to the data signal addressed to the terminal apparatus 2. Meanwhile, the precoding in consideration of the antenna gain in the vertical direction cannot be performed on the data signal addressed to the terminal apparatus 3. However, similar to the second embodiment, the open-loop type transmission diversity processing such as cyclic shift diversity may be performed in advance.

The precoding unit 27 outputs the calculated transmission signal vector to the antenna unit 29. Since the signal processing in other configuration components of the base station apparatus 1b is the same in the second embodiment, the description thereof will be omitted.

The fourth embodiment targets a wireless communication system that performs MU-MIMO transmission in which the plurality of terminal apparatuses 3 which are legacy terminal apparatuses without considering the antenna gain in the vertical direction included in the base station apparatus 1b in addition to the plurality of terminal apparatuses 2 are simultaneously connected to the base station apparatus 1b. According to the method of the present embodiment, since it is possible to spatially multiplex the terminal apparatus 2 and the terminal apparatus 3 which is the legacy terminal apparatus, it is possible to realize a wireless communication system capable of realizing high frequency use efficiency while maintaining backward compatibility.

5. Fifth Embodiment

The third and fourth embodiments target a wireless communication system which performs MU-MIMO transmission in which a plurality of terminal apparatuses are simultaneously connected to the base station apparatus. However, the information that the base station apparatus can use for precoding is mainly about the desired linear filter that is transmitted by each terminal apparatus. Therefore, the base station apparatus cannot correctly recognize the inter-user interference and the like that each terminal apparatus actually receives. Therefore, opportunities in which the plurality of terminal apparatuses can be spatially multiplexed are not very many, there is limited improvement in the frequency use efficiency. The present embodiment targets the wireless communication system in which the base station apparatus can use information associated with the inter-user interference (IUI) power that each terminal apparatus actually receives.

The wireless communication system that is the target of the embodiment is the same as in FIG. 10 and FIG. 12. The following description will be described separately for (1) a status where all terminal apparatuses are the terminal apparatus 2 and (2) a status where the terminal apparatus 2 and the terminal apparatus 3 coexist.

[5.1. Terminal Apparatus 2]

The configuration of the terminal apparatus 2 according to the present embodiment is the same as in FIG. 6. The signal processing in the feedback information generation unit 55 is different.

In the first to fourth embodiments, the feedback information generation unit 55 calculates a desired linear filter (for example, the linear filter maximizing the reception SNR, and the like) that improves the reception quality of the terminal apparatus 2. In other words, the feedback information generation unit 55 calculates the linear filter that is desired to be multiplied to the data signal addressed to the terminal apparatus 2. In the present embodiment, the terminal apparatus 2 notifies the base station apparatus 1b of not only the desired linear filter but also the fourth linear filter associated with IUI that the terminal apparatus 2 actually receives at the time of the MU-MIMO transmission.

A method is considered in which that the feedback information generation unit 55 calculates the linear filter that lowers the reception quality of the terminal apparatus 2 as the fourth linear filter. For example, the linear filter minimizing the reception SNR and the reception SINR corresponds to the fourth linear filter. In other words, if the transmission data addressed to another terminal apparatus 2 is transmitted while being multiplied with the fourth linear filter, this means that the signal does not reach the terminal apparatus 2. In other words, when the fourth linear filter of which notification is sent from the first terminal apparatus 2 and the desired linear filter of which notification is sent from the second terminal apparatus 2 match with each other, and at the same time, the fourth linear filter of which notification is sent from the second terminal apparatus 2 and the desired linear filter of which notification is sent from the first terminal apparatus 2 match with each other, it can be said that the channels of the first and second terminal apparatuses 2 are likely to be orthogonal to each other. Accordingly, highly efficient MU-MIMO transmission is realized by spatially multiplexing the first and second terminal apparatuses 2.

The feedback information generation unit 55 may generate the linear filter that improves the reception quality, as the fourth linear filter. For example, the feedback information generation unit 55 may generate the linear filter that can realize the next higher reception SNR of the desired linear filter, as the fourth linear filter. In this case, it is desirable that the desired linear filter and the third linear filter are as orthogonal as possible (in other words, mutual inner product value is small). If the transmission data addressed to another terminal apparatus 2 is transmitted while being multiplied with the third linear filter, this represents that the signal is received also in the terminal apparatus 2, with great reception power. When the fourth linear filter of which notification is sent from the first terminal apparatus 2 and the desired linear filter of which notification is sent from the second terminal apparatus 2 match with each other, and at the same time, the fourth linear filter of which notification is sent from the second terminal apparatus 2 and the desired linear filter of which notification is sent from the first terminal apparatus 2 match with each other, this represents that the channels of the first and second terminal apparatuses 2 are likely to be not orthogonal to each other. Accordingly, highly efficient MU-MIMO transmission is realized by spatially multiplexing other terminal apparatuses 2, without spatially multiplexing the first and second terminal apparatuses 2.

The feedback information generation unit 55 calculates the fourth linear filter described above, for the antenna group in the horizontal direction and the antenna group in the vertical direction, and outputs the fourth linear filter to the terminal antenna unit 51. Hereinafter, the linear filter associated with the antenna group in the horizontal direction is referred to as a fifth linear filter. Further, the linear filter associated with the antenna group in the vertical direction is referred to as a sixth linear filter. In addition, in order to suppress the overhead related to the feedback notification, the notification period of the fifth linear filter and the notification period of the sixth linear filter may have different values.

Further, it may be controlled so as not to perform the notification of the fourth linear filter associated with one antenna. Although details will be described later, for example, when the base station apparatus 1b performs spatial multiplexing of the terminal apparatus 2 and the terminal apparatus 3, since the terminal apparatus 3 cannot consider the antenna group in the vertical direction, even if the terminal apparatus 2 perform the notification of the sixth linear filter associated with the antenna group in the vertical direction, the base station apparatus 1b cannot consider the orthogonality of the channels of the terminal apparatus 2 and the terminal apparatus 3. Accordingly, the overhead related to the feedback notification may be suppressed by controlling the terminal apparatus 2 so as to report only the fifth linear filter. In addition, on the assumption of the spatial multiplexing of the terminal apparatuses 2, the terminal apparatus 2 may be controlled so as to report only the sixth linear filter.

When the codebook of the single codebook structure is stored in the codebook storage unit 65, as the present embodiment, it is not possible to independently control the notification of the fourth linear filter, in the antenna group in the horizontal direction and the antenna group in the vertical direction. Therefore, the overhead is not suppressed efficiently, and thus results in giving a limit to the improved amount of frequency use efficiency due to the fourth linear filter. In the present embodiment, since the codebook of the double codebook structure is stored in the codebook storage unit 65, the terminal apparatus 2 can flexibly change the notification method of the fifth linear filter and the sixth linear filter, it is possible to suppress the overhead, without giving a limit to the improved amount of frequency use efficiency due to the fourth linear filter.

Further, the feedback information generation unit 55 may be controlled so as to perform grouping of the linear filters which are described in advance in the codebook, in accordance with the orthogonality and chordal distance between the linear filters and report the index of the group as the control information associated with the fourth linear filter. This is the same in the feedback information generation unit 67 of the terminal apparatus 3 which will be described later.

In addition, with respect to the fourth linear filter, the codebooks stored in the codebook storage unit 65 and the codebook storage unit 69 included in the spatially multiplexed terminal apparatuses are the same, or a plurality of the same linear filters are described therein. Therefore, in the wireless communication system in which not only the terminal apparatus 2 but also the terminal apparatus 3 are simultaneously connected to the base station apparatus 1b, at least the second codebook, among the codebooks of the double codebook structure stored in the codebook storage unit 65 of the terminal apparatus 2, needs to be the same as the fourth codebook stored in the codebook storage unit 69 of the terminal apparatus 3, or to describe a plurality of the same linear filters.

In addition, since the signal processing in other configuration components of the terminal apparatus 2 is the same in the third embodiment, the description thereof will be omitted.

[5.2. Terminal Apparatus 3]

The configuration of the terminal apparatus 3 according to the present embodiment is the same as that of FIG. 9. The signal processing in the feedback information generation unit 67 is different from in FIG. 9.

Similar to the terminal apparatus 2, the feedback information generation unit 67 calculates a seventh linear filter associated with the IUI power that the terminal apparatus 3 actually receives at the time of the MU-MIMO transmission, in addition to the desired linear filter. Similar to the fourth linear filter of the terminal apparatus 2, the seventh linear filter generated by the feedback information generation unit 67 may generate a linear filter that lowers the reception quality (for example, a linear filter minimizing the reception SNR) or a linear filter that improves the reception quality (for example, a linear filter that realizes the next highest reception SNR of the desired linear filter).

However, the feedback information generation unit 67 may calculate only the seventh linear filter associated with the antenna group in the horizontal direction. For example, the feedback information generation unit 67 may extract the linear filter minimizing the reception SNR from the codebook stored in the codebook storage unit 69, based on $h_H$ that input from the channel estimation unit 71, and output the control information (for example, an index on the codebook of the linear filter, and the like) associated with the extracted linear filter, to the terminal antenna unit 51.

When the codebook storage unit 65 stores the codebook of the single codebook structure considering also the antenna group in the vertical direction in the terminal apparatus 2, there is no association between the seventh linear filter that the terminal apparatus 3 notifies the base station apparatus 1b and the fourth linear filter that the terminal apparatus 2 notifies the base station apparatus 1b. Therefore, the base station apparatus 1b cannot determine the combination of the terminal apparatus 2 and the terminal apparatus 3 that are spatially multiplexed, based on the third linear filter, and the combination of the terminal apparatuses that can be spatially multiplexed is limited to a plurality of terminal apparatuses 2, or a plurality of terminal apparatuses 3. In the present embodiment, by setting at least some of the linear filters described in the second codebook stored in the codebook storage unit 65 to be equal to the linear filters described in the codebook stored in the codebook storage unit 69. There may be association between the seventh linear filter that the terminal apparatus 3 notifies the base station apparatus 1b and the fourth linear filter that the terminal apparatus 2 notifies the base station apparatus 1b. Accordingly, since the base station apparatus 1b can realize the spatial multiplexing of the terminal apparatus 2 and the terminal apparatus 3, the frequency use efficiency can be further improved.

In addition, since the signal processing in other configuration components of the terminal apparatus 3 is the same in the fourth embodiment, the description thereof will be omitted.

[5.3. Base Station Apparatus 1b]

The configuration of the base station apparatus 1b according to the present embodiment is the same in FIG. 11 and the signal processing in each configuration component is substantially the same as in the fourth embodiment. The signal processing in the control information acquisition unit 31, the channel information acquisition unit 33, the mapping unit 25, and the precoding unit 27 are different.

First, the control information acquisition unit 31 acquires control information of which notification is sent from a plurality of terminal apparatuses 2 and a plurality of terminal apparatuses 3 which are connected. Then, the control information acquisition unit 31 outputs the control information associated with the first to seventh linear filters, to the channel information acquisition unit 33.

The channel information acquisition unit 33 acquires the first linear filter W1 and the second linear filter W2 that are required by respective terminal apparatuses, W5 and W6 which are the fourth linear filters associated with the respective linear filters, and the seventh linear filter, based on the control information that is input from the control information acquisition unit 31 and the codebook information that is stored in the codebook storage unit 35, and outputs the acquired linear filters to the precoding unit 27 and the mapping unit 25. At this time, the channel information acquisition unit 33 acquires W1, W2, W5 and W6 for the terminal apparatus 2, and acquires W3 and W7 for the terminal apparatus 3.

The precoding unit 27 calculates a transmission signal vector by performing precoding on the data signal addressed to each terminal apparatus, based on each linear filter of which notification is sent from each terminal apparatus. The basic precoding method is the same as in the fourth embodiment. Meanwhile, the mapping unit 25 determines the combination of the terminal apparatuses that are spatially multiplexed by the base station apparatus 1b, by using the third linear filter, in addition to the first and second linear filters.

First, the case where the base station apparatus 1b spatially multiplexes a plurality of terminal apparatuses 2 is considered. The fourth linear filter is associated with the IUI power that each terminal apparatus 2 actually observers. For example, the case where each terminal apparatus 2 sends the notification of the linear filter minimizing the reception SNR of the terminal apparatus 2 as the fourth linear filter is considered. If W5 which is one of the fourth linear filters of which notification is sent by the first terminal apparatus 2 and W1 of which notification is sent by the second terminal apparatus 2 match with each other and W5 of which notification is sent from the second terminal apparatus 2 and W1 of which notification is sent by the first terminal apparatus 2 match with each other, this means that the channel of the first terminal apparatus 2 and the channel of the second terminal apparatus 2 are likely to be orthogonal to each other. In this case, the mapping unit 25 may determine the mapping of the data signal addressed to each terminal apparatus in such a manner that the terminal apparatuses 2 having this relationship are preferentially subjected to spatial multiplexing. Although the above description considers the linear filter associated with the antenna group in the horizontal direction, the same is applied to the case of considering the linear filter associated with the antenna group in the vertical direction. Of course, the mapping unit 25 may consider both the fifth linear filter and the sixth linear filter.

Meanwhile, when each terminal apparatus 2 sends the notification of the linear filter that improves the reception SNR of the terminal apparatus 2 as the fourth linear filter, the mapping unit 25 may determine the mapping of the data signal addressed to each terminal apparatus in such a manner that the terminal apparatuses 2 of which the desired linear filter (W1 and W2) and the fourth linear filter match with each other are not subjected to spatial multiplexing. This is because the channels of the terminal apparatuses 2 having such a relationship are likely not to be orthogonal to each other.

Next, the case where the base station apparatus 1b spatially multiplexes the terminal apparatus 2 and the terminal apparatus 3 is considered. In this case, the notification of only the seventh linear filter associated with the antenna group in the horizontal direction is sent from the terminal apparatus 3. In the present embodiment, some or all of the linear filters described in the second codebook stored in the codebook storage unit 65 of the terminal apparatus 2 matches with the linear filters described in the fourth codebook stored in the codebook storage unit 69 of the terminal apparatus 3. Therefore, the mapping unit 25 can determine the orthogonality between the channels of the terminal apparatus 2 and the terminal apparatus 3, based on the W1 and W3 which are the desired linear filter associated with the antenna group in the horizontal direction, W5 associated with W1, and W7 associated with W3. Accordingly, the mapping unit 25 may perform the mapping of the data signal, based on W1, W5, W3 and W7. In addition, even when the base station apparatus 1b spatially multiplexes a plurality of terminal apparatuses 3, the mapping unit 25 may perform the mapping of the data signal, based on W3 and W7.

In the above description, it is assumed that the mapping unit 25 performs the mapping of the data signal, based on the linear filter of which notification is sent from each of the terminal apparatus 2 and the terminal apparatus 3, but may perform the mapping based on other types of control information of which notification is sent from each terminal apparatus (for example, information associated with the reception quality, and the like). The mapping unit 25 may perform again re-mapping of the data signal, based on the result of the precoding performed once by the precoding unit 27.

Further, the mapping unit 25 may perform grouping of the linear filters which are described in advance in the codebook, in accordance with the orthogonality and chordal distance between the linear filters, and perform the mapping of the data signal, based on the grouping of the desired linear filter of which notification is sent from each terminal apparatus and the codebook, irrespective of notification of the third linear filter.

For example, it is assumed that the linear filters described in the codebook is divided into a first group and a second group, and the linear filters described in the first group and the linear filters described in the second group have high orthogonality therebetween. In this case, when the desired linear filter W1 of which notification is sent by the first terminal apparatus 2 and the second terminal apparatus 2 belongs to the first group and the desired linear filter W4 of which notification is sent by the third terminal apparatus 2 belongs to the second group, it is known that the orthogonality between the channels of the first and third terminal apparatuses and the orthogonality between the channels of the second and the third terminal apparatuses are high, while the orthogonality between the channels of the first and second terminal apparatuses 2 is low. The mapping unit 25 may perform the mapping of the data signal, based on the information.

Since the signal processing in other configuration components of the base station apparatus 1b is the same as in the fourth embodiment, the description thereof will be omitted.

The present embodiment targets the wireless communication system in which each terminal apparatus notifies the base station apparatus 1b of the fourth linear filter as information associated with the actually received IUI power, in addition to the desired linear filter. According to the present embodiment method, it is possible to suppress an increase in the overhead relating to the notification of the fourth linear filter to the required minimum amount, and spatially multiplex the terminal apparatus 3 and the terminal apparatus 2 which are the legacy terminal apparatus with high efficiency, and thus the present embodiment method can contribute the improvement in frequency use efficiency while maintaining backward compatibility.

6. Common in all Embodiments

Hitherto, although the embodiments of the present invention have been described in detail with reference to the accompanying drawings, the specific configuration is not intended to be limited to these embodiments, and the design within the range without departing from the spirit of the invention is included in claims.

In addition, the present invention is not intended to be limited to the embodiments described above. The terminal apparatus 2 and the terminal apparatus 3 of the present invention are not intended to be limited to the application to the terminal apparatus such as a cellular system, and it is needless to say that the terminal apparatuses can be applied to electronic devices of a stationary type installed in indoors or non-movable type electronic devices, for example, AV equipment, kitchen equipment, cleaning and washing equipment, air-conditioning equipment, office equipment, vending machine, and other household appliances.

The programs executed in the terminal apparatus 2, the terminal apparatus 3, the base station apparatus 1 and the base station apparatus 1b according to the present invention are programs for controlling a CPU and the like (programs causing a computer to function) so as to implement the functions of the above embodiments according to the present invention. The information handled by these devices is temporarily stored in a RAM during processing, then stored in various ROMs and HDDs, read by the CPU as necessary, and modified and written. A recording medium for storing a program may be any of a semiconductor medium (for example, a ROM, a nonvolatile memory card, and the like), an optical recording medium (for example, a DVD, a MO, a MD, a CD, a BD, and the like), a magnetic recording medium (for example, a magnetic tape, a flexible disk, and the like). Further, the functions of the embodiments described above are implemented by executing the loaded program, and the functions of the present invention are implemented, by processing the loaded program in cooperation with the operating system or other application programs, based on the instructions of the programs.

In the case of distributing the program in the market, the program can be distributed while being stored in a portable recording medium, or the program can be transmitted to a server computer connected through a network such as the Internet. In this case, the storage device of the server computer is also included in the present invention. Further, some or all of the terminal apparatus 2, the terminal apparatus 3, and the base station apparatus 1 in the embodiments described above may be typically implemented as an LSI which is an integrated circuit. The respective functional blocks in the terminal apparatus 2, the terminal apparatus 3, and the base station apparatus 1 may be made into individual processors, or some or all thereof may be integrated and made into processors. Further, the method of circuit integration is not limited to LSI, and the respective functional blocks may be implemented by a dedicated circuit or a general-purpose processor. Further, when an integrated circuit technology that replaces the LSI due to the advancement of the semiconductor technology has emerged, it is also possible to use an integrated circuit according to the art.

[Overview]

(1) To achieve the above object, the present invention uses the following means. In other words, a base station apparatus according to the present invention is a base station apparatus including a plurality of antennas and capable of adjusting antenna gains in a horizontal direction and a vertical direction of the plurality of antennas, by adjusting a phase and an amplitude of a signal addressed and transmitted to a terminal apparatus, from the plurality of antennas, including a first codebook storage unit that stores a first codebook which is shared with the terminal apparatus and includes a second codebook describing a plurality of linear filters associated with antenna gains in the horizontal direction and a third codebook describing a plurality of linear filters associated with antenna gains in the vertical direction; a control information acquisition unit that acquires control information indicating at least one out of a plurality of linear filters described in the second codebook and a plurality of linear filters described in the third codebook, of which notification is sent from the terminal apparatus; a precoding unit that performs precoding on the signal addressed to the terminal apparatus, based on the control information and the first codebook; and a wireless transmission unit that transmits the signal subjected to the precoding.

In the base station apparatus, the linear filter associated with the antenna gain in the horizontal direction and the linear filter associated with the vertical direction are fed back from the terminal apparatus based on the codebook shared with the terminal apparatus. The base station apparatus can perform highly efficient precoding transmission while minimizing an increase in an amount of feedback information due to an increase in the number of antennas, by performing precoding on the signal addressed to the terminal apparatus, based on the linear filter that is fed back. As a result, it is possible to improve frequency use efficiency.

(2) Further, in the base station apparatus according to present invention, the precoding unit performs precoding on a plurality of the signals addressed to the terminal apparatuses, based on the control information and the first codebook, and the wireless transmission unit spatially multiplexes the signals subjected to the precoding, and transmits the spatially multiplexed signals to a plurality of the terminal apparatuses.

In the base station apparatus, the linear filter associated with the antenna gain in the horizontal direction and the linear filter associated with the vertical direction are fed back from a plurality of terminal apparatuses based on the codebook shared with the terminal apparatus. The base station apparatus can perform MU-MIMO transmission of spatially multiplexing the signal subjected to the precoding and transmitting the spatially multiplexed signal, by performing precoding on the signal addressed to the terminal apparatus, based on the linear filter that is fed back. As a result, it is possible to improve frequency use efficiency.

(3) Further, in the base station apparatus according to present invention, the control information includes control information indicating at least one out of a first linear filter described in the second codebook that maximizes the reception quality of the terminal apparatus, a second linear filter described in the third codebook that maximizes the reception quality of the terminal apparatus, a fifth linear filter described in the second codebook that minimizes the reception quality of the terminal apparatus, and a sixth linear filter described in the third codebook that minimizes the reception quality of the terminal apparatus, the precoding unit performs precoding on the plurality of the signals addressed to the terminal apparatuses, based on at least one out of linear filters described in the second codebook and the third codebook which are indicated by the control information, and the reception quality is any of a reception signal-to-noise power ratio, a reception signal-to-interference plus noise power ratio, and a channel capacity.

In the base station apparatus, the linear filter maximizing the reception quality of each terminal apparatus and the linear filter minimizing the reception quality are fed back from the plurality of terminal apparatuses. Since the base station apparatus can perform precoding on signals addressed to each terminal apparatus while considering the inter-user interference power that each terminal apparatus actually observes, the base station apparatus can perform highly efficient MU-MIMO transmission while minimizing an increase in an amount of feedback information due to an increase in the number of antennas. As a result, it is possible to improve frequency use efficiency.

(4) Further, the base station apparatus according to present invention is the base station apparatus described in any of (1) to (3), and further includes a mapping unit that multiplexes the signal addressed to the terminal apparatus with a reference signal which is known to the base station apparatus and the terminal apparatus, the known reference signal includes a first reference signal associated with an antenna gain in the horizontal direction, and a second reference signal associated with an antenna gain in the vertical direction, the first reference signal and the second reference signal are transmitted using radio resources which are orthogonal to each other, and transmission periods of the first reference signal and the second reference signal are identical to each other.

Since such a base station apparatus transmits the reference signal associated with the antenna gain in the horizontal direction and the reference signal associated with the antenna gain in the vertical direction by respectively using radio resources which are orthogonal to each other and it is possible to make the transmission periods same, it is possible to suppress the overhead associated with the transmission of the reference signal. As a result, it is possible to improve frequency use efficiency.

(5) Further, the base station apparatus according to present invention is the base station apparatus described in any of (1) to (3), and further includes a mapping unit that multiplexes the signal addressed to the terminal apparatus with a reference signal which is known to the base station apparatus and the terminal apparatus, the known reference signal includes a first reference signal associated with an antenna gain in the horizontal direction, and a second reference signal associated with an antenna gain in the vertical direction, the first reference signal and the second reference signal are transmitted using radio resources which are orthogonal to each other, and transmission periods of the first reference signal and the second reference signal are different from each other.

Since such a base station apparatus transmits the reference signal associated with the antenna gain in the horizontal direction and the reference signal associated with the antenna gain in the vertical direction by respectively using radio resources which are orthogonal to each other and it is possible to set the transmission periods to values which are different from each other, it is possible to suppress the overhead associated with the transmission of the reference signal. As a result, it is possible to improve frequency use efficiency.

(6) Further, the base station apparatus according to present invention is the base station apparatus described in (2), in which a plurality of the terminal apparatuses include a first terminal apparatus and a second terminal apparatus, the control information acquisition unit acquires first control information indicating at least one out of the linear filters of which notification is sent from the first terminal apparatus and which are described in the second codebook, and second control information indicating at least one out of linear filters of which notification is sent from the second terminal apparatus, and which are associated with the antenna gain in the horizontal direction, and are described in a fourth codebook of which at least some are in common with the linear filters described in the second codebook, the precoding unit performs precoding on a signal addressed to the first terminal apparatus and a signal addressed to the second terminal apparatus, based on at least one out of the linear filter described in the second codebook which is indicated by the first control information and the linear filter described in the fourth codebook which is indicated by the second control information, and the wireless transmission unit spatially multiplexes the signals subjected to the precoding, and transmits the spatially multiplexed signals to the plurality of terminal apparatuses.

The base station apparatus acquires the linear filter associated with the antenna gain in the horizontal direction and the antenna gain in the vertical direction from the first terminal apparatus, and acquires the linear filter associated with the antenna gain in the horizontal direction from the second terminal apparatus. The base station apparatus can perform communication both the first terminal apparatus and the second terminal apparatus of which the antenna gain in the vertical direction is not recognizable, by performing precoding on the signal addressed to each terminal apparatus based on at least one out of the acquired linear filters. As a result, it is possible to improve frequency use efficiency while maintaining backward compatibility.

(7) Further, the base station apparatus according to present invention is the base station apparatus described in (6), in which the control information acquisition unit acquires first control information indicating at least one out of a first linear filter described in the second codebook that maximizes the reception quality of the first terminal apparatus, a second linear filter described in the third codebook that maximizes the reception quality of the first terminal apparatus, a fifth linear filter described in the second codebook that minimizes the reception quality of the first terminal apparatus, and a sixth linear filter described in the third codebook that minimizes the reception quality of the first terminal apparatus, of which notification is sent from the first terminal apparatus, and second control information indicating at least one out of a sixth linear filter described in the fourth codebook that maximizes the reception quality of the second terminal apparatus, and a linear filter described in the fourth codebook that minimizes the reception quality of the second terminal apparatus, of which notification is sent from the second terminal apparatus, and the precoding unit performs precoding on the plurality of signals addressed to terminal apparatuses, based on at least one out of the linear filters described in the second codebook and the third codebook which are indicated by the first control information and the linear filter described in the fourth codebook which is indicated by the second control information.

In the base station apparatus, at least some linear filters among the linear filters described in the codebook included in the first terminal apparatus and the linear filters described in the codebook included in the second terminal apparatus are in common, and the notification of the linear filter maximizing the reception quality of the base station apparatus and the linear filter minimizing the reception quality is sent from the respective terminal apparatuses. Since the base station apparatus can recognize the inter-user interference that is actually observed by the second terminal apparatus incapable of recognizing the antenna gain in the vertical direction, in addition to the first terminal apparatus, the first terminal apparatus and the second terminal apparatus can realize the MU-MIMO transmission with high efficiency. As a result, it is possible to improve the frequency use efficiency while securing backward compatibility.

(8) Further, the base station apparatus according to present invention is the base station apparatus described in (6), and further includes a mapping unit that determines a destination terminal apparatus of the signal that is spatially multiplexed and transmitted by the wireless transmission unit, from the plurality of terminal apparatuses, the control information acquisition unit acquires first control information indicating each of a first linear filter described in the second codebook that maximizes the reception quality of the first terminal apparatus, and a sixth linear filter described in the third codebook that minimizes the reception quality of the first terminal apparatus, of which notification is sent from the first terminal apparatus, and second control information indicating a third linear filter described in the fourth codebook that maximizes the reception quality of the second terminal apparatus, of which notification is sent from the second terminal apparatus, the mapping unit determines the destination terminal apparatus, based on the sixth linear filter and the third linear filter, and the precoding unit performs precoding on a signal addressed to the destination terminal apparatus, based on the first linear filter and the third linear filter.

In the base station apparatus, at least some linear filters among the linear filters described in the codebook included in the first terminal apparatus and the linear filters described in the codebook included in the second terminal apparatus are in common, and the notification of the linear filter maximizing the reception quality of the base station apparatus and the linear filter minimizing the reception quality is sent from the respective terminal apparatuses. Since the base station apparatus can recognize the inter-user interference that is actually observed by the second terminal apparatus incapable of recognizing the antenna gain in the vertical direction, in addition to the first terminal apparatus, the first terminal apparatus and the second terminal apparatus can realize the MU-MIMO transmission with high efficiency. As a result, it is possible to improve the frequency use efficiency while securing backward compatibility.

(9) A terminal apparatus according to the present invention is a terminal apparatus which is a first terminal apparatus communicating with a base station apparatus including a plurality of antennas and capable of adjusting antenna gains in a horizontal direction and a vertical direction of the plurality of antennas, by adjusting a phase and an amplitude of a signal addressed and transmitted to the terminal apparatus, from the plurality of antennas, including a first codebook storage unit that stores a first codebook which is shared with the base station apparatus and includes a second codebook describing a plurality of linear filters associated with antenna gains in the horizontal direction and a third codebook describing a plurality of linear filters associated with antenna gains in the vertical direction; a feedback information generation unit that generates control information indicating at least one out of a plurality of linear filters described in the second codebook and a plurality of linear filters described in the third codebook; and a wireless transmission unit that notifies the base station apparatus of the control information.

The terminal apparatus notifies the base station apparatus of the linear filter associated with the antenna gain in the horizontal direction and the linear filter associated with the antenna gain in the vertical direction, among a plurality of antennas included in the base station apparatus, based on the codebook shared with the base station apparatus. As a result, the base station apparatus can perform highly efficient precoding transmission, while suppressing an increase in the amount of feedback information due to an increase in the number of antennas of the base station apparatus to the minimum. As a result, it is possible to improve frequency use efficiency.

(10) In the terminal apparatus according to the present invention, the feedback information generation unit generates first control information indicating at least one out of a first linear filter described in the second codebook that maximizes the reception quality of the terminal apparatus, a second linear filter described in the third codebook that maximizes the reception quality of the terminal apparatus, and second control information indicating at least one out of a fifth linear filter described in the second codebook that minimizes the reception quality of the terminal apparatus, and a sixth linear filter described in the third codebook that minimizes the reception quality of the terminal apparatus, and the reception quality is any of a reception signal-to-noise power ratio, a reception signal-to-interference plus noise power ratio, and a channel capacity.

The terminal apparatus notifies the base station apparatus of the linear filter minimizing the reception quality, in addition to the linear filter maximizing the reception quality of the terminal apparatus. As a result, since the base station apparatus can recognize the inter-user interference that is actually observed by each terminal apparatus, it is possible to perform highly efficient MU-MIMO transmission, while suppressing an increase in the amount of feedback information due to an increase in the number of antennas of the base station apparatus to the minimum. As a result, it is possible to improve frequency use efficiency.

(11) In the terminal apparatus according to the present invention, the terminal apparatus communicating with the base station apparatus includes the first terminal apparatus and a second terminal apparatus, and at least some of a plurality of linear filters described in the second codebook are in common with a plurality of linear filters which are described in the fourth codebook stored in the second terminal apparatus and associated with an antenna gain in the horizontal direction.

In this manner, the terminal apparatuses include the first terminal apparatus that can recognize both the antenna gains in the horizontal direction and the vertical direction and the second terminal apparatus that can recognize only the antenna gain in the horizontal direction, and at least some of the linear filters described in the codebook included in the first terminal apparatus and the linear filter described in the codebook included in the second terminal apparatus are in common. As a result, since the base station apparatus can recognize the inter-user interference that is actually observed by the second terminal apparatus, it is possible to perform highly efficient MU-MIMO transmission, while suppressing an increase in the amount of feedback information due to an increase in the number of antennas of the base station apparatus to the minimum. As a result, it is possible to improve the frequency use efficiency while securing backward compatibility.

(12) Further, the terminal apparatus according to the present invention is the terminal apparatus described in any of (9) to (11), in which periods in which the base station apparatus is notified of control information associated with the first linear filter and the second linear filter among the plurality of linear filters are identical to each other.

Since such a terminal apparatus can appropriately set the periods in which the base station apparatus is notified of the linear filter associated with the antenna gain in the horizontal direction and the linear filter associated with the antenna gain in the vertical direction, it is possible to suppress overhead related to the feedback. As a result, it is possible to improve frequency use efficiency.

(13) Further, the terminal apparatus according to the present invention is the terminal apparatus described in any of (9) to (11), in which periods in which the base station apparatus is notified of control information associated with the first linear filter and the second linear filter among the plurality of linear filters are identical to each other.

Since such a terminal apparatus can appropriately set the periods in which the base station apparatus is notified of the linear filter associated with the antenna gain in the horizontal direction and the linear filter associated with the antenna gain in the vertical direction, it is possible to suppress overhead related to the feedback. As a result, it is possible to improve frequency use efficiency.

(14) Further, the wireless communication system according to the present invention includes the base station apparatus described in (1) and at least one out of the plurality of terminal apparatuses described in (9).

Since the wireless communication system includes the base station apparatus described in (1) and at least one out of the plurality of terminal apparatuses described in (9), it is possible to perform highly efficient precoding transmission, while suppressing an increase in the amount of feedback information due to an increase in the number of antennas of the base station apparatus to the minimum. As a result, it is possible to improve frequency use efficiency.

(15) An integrated circuit according to the present invention is an integrated circuit which is mounted in a base station apparatus including a plurality of antennas and capable of adjusting antenna gains in a horizontal direction and a vertical direction of the plurality of antennas, by adjusting a phase and an amplitude of a signal addressed and transmitted to a terminal apparatus, from the plurality of antennas, and causes the base station apparatus to exert a series of functions including a function of storing a first codebook which is shared with the terminal apparatus and includes a second codebook describing a plurality of linear filters associated with antenna gains in the horizontal direction and a third codebook describing a plurality of linear filters associated with antenna gains in the vertical direction; a function of acquiring control information indicating at least one out of a plurality of linear filters described in the second codebook and a plurality of linear filters described in the third codebook, of which notification is sent from the terminal apparatus; a function of performing precoding on the signal addressed to the terminal apparatus, based on the control information and the first codebook; and a function of transmitting the signal subjected to the precoding.

Since the linear filter associated with the antenna gain in the horizontal direction and the linear filter associated with the vertical direction are fed back from the terminal apparatus to the base station apparatus, based on the codebook shared with the terminal apparatus, and precoding is performed on the signal addressed to the terminal apparatus based on the fed back linear filters, such an integrated circuit enables the base station apparatus to exert the function of performing highly efficient precoding transmission, while suppressing an increase in the amount of feedback information due to an increase in the number of antennas to the minimum. As a result, it is possible to improve frequency use efficiency.

(16) An integrated circuit according to the present invention is an integrated circuit which is mounted in a terminal apparatus communicating with a base station apparatus including a plurality of antennas and capable of adjusting antenna gains in a horizontal direction and a vertical direction of the plurality of antennas, by adjusting a phase and an amplitude of a signal addressed and transmitted to the terminal apparatus, from the plurality of antennas, and causes the terminal apparatus to exert a series of functions including a function of storing a first codebook which is shared with the base station apparatus and includes a second codebook describing a plurality of linear filters associated with antenna gains in the horizontal direction and a third codebook describing a plurality of linear filters associated with antenna gains in the vertical direction; a function of generating control information indicating at least one out of a plurality of linear filters described in the second codebook and a plurality of linear filters described in the third codebook; and a function of notifying the base station apparatus of the control information.

Since the terminal apparatus notifies the base station apparatus of the linear filter associated with the antenna gain in the horizontal direction and the linear filter associated with the antenna gain in the vertical direction, among a plurality of antennas included in the base station apparatus, based on the codebook shared with the base station apparatus, such an integrated circuit enables the terminal apparatus to exert the function of performing highly efficient precoding transmission, while suppressing an increase in the amount of feedback information due to an increase in the number of antennas of the base station apparatus to the minimum. As a result, it is possible to improve frequency use efficiency.

INDUSTRIAL APPLICABILITY

The present invention is suitable for used in the base station apparatus, the terminal apparatus, the wireless communication system, and the integrated circuit.

REFERENCE SIGNS LIST 1, 1b BASE STATION APPARATUS
2, 2-1, 2-2, 2-3, 2-4, 2-u, 3, 3-1, 3-2 TERMINAL APPARATUS
21, 21b CHANNEL CODING UNIT
23, 23b DATA MODULATION UNIT
25 MAPPING UNIT
27 PRECODING UNIT
29 ANTENNA UNIT
29-1 IFFT UNIT
29-2 GI INSERTION UNIT
29-3 WIRELESS TRANSMISSION UNIT
29-4 WIRELESS RECEPTION UNIT
29-5 ANTENNA
31 CONTROL INFORMATION ACQUISITION UNIT
33 CHANNEL INFORMATION ACQUISITION UNIT
35, 65, 69 CODEBOOK STORAGE UNIT
51 TERMINAL ANTENNA UNIT
51-1 WIRELESS RECEPTION UNIT
51-2 WIRELESS TRANSMISSION UNIT
51-3 GI REMOVING UNIT
51-4 FFT UNIT
51-5 REFERENCE SIGNAL SEPARATION UNIT
51-6 ANTENNA
53, 71 CHANNEL ESTIMATION UNIT
55, 67 FEEDBACK INFORMATION GENERATION UNIT
57 CHANNEL EQUALIZATION UNIT
59 DEMAPPING UNIT
61 DATA DEMODULATION UNIT
63 CHANNEL DECODING UNIT

The invention claimed is:

1. A terminal apparatus that communicates with a base station apparatus including a plurality of antenna ports, comprising:
wireless reception circuitry that receives a channel state information reference signal (CSI-RS) from the base station apparatus; and
wireless transmission circuitry that transmits feedback information generated based on the CSI-RS to the base station apparatus; wherein
the feedback information is information associated with a codebook describing a plurality of first linear filters corresponding to precoding of a first dimension and a plurality of second linear filters corresponding to precoding of a second dimension,
the CSI-RS, the plurality of first linear filters, and the plurality of second linear filters are associated with a number of the plurality of antenna ports,
the codebook includes a setting in which a number of the plurality of first linear filters each corresponding to the precoding of the first dimension is equal to a number of the plurality of second linear filters each corresponding to the precoding of the second dimension, and
the plurality of first linear filters corresponding to the precoding of the first dimension has a same norm as that of the plurality of second linear filters corresponding to the precoding of the second dimension.

2. The terminal apparatus according to claim 1, wherein the feedback information includes indices indicating the plurality of first linear filters corresponding to the precoding of the first dimension, and the plurality of second linear filters corresponding to the precoding of the second dimension, both of the plurality of first linear filters and the plurality of second linear filters being included in the codebook.

3. The terminal apparatus according to claim 1, wherein a number of the plurality of first linear filters described in the codebook is changed by a number of the plurality of first linear filters oversampled in a space direction, and a number of the plurality of second linear filters described in the codebook is changed by a number of the plurality of second linear filters oversampled in the space direction.

4. The terminal apparatus according to claim 1, wherein the codebook is associated with indices of the plurality of antenna ports.

5. The terminal apparatus according to claim 1, wherein the plurality of first linear filters corresponding to the precoding of the first dimension and the plurality of second linear filters corresponding to the precoding of the second dimension are updated by the base station apparatus.

6. The terminal apparatus according to claim 1, wherein the precoding of the first dimension is one of precoding corresponding to an antenna gain in a horizontal direction and precoding corresponding to an antenna gain in a vertical direction, and the precoding of the second dimension is the other precoding.

7. The terminal apparatus according to claim 1, wherein the CSI-RS includes a first reference signal sequence associated with the plurality of first linear filters corresponding to the precoding of the first dimension and a second reference signal sequence associated with the plurality of second linear filters corresponding to the precoding of the second dimension.

8. A communication method of a terminal apparatus that communicates with a base station apparatus including a plurality of antenna ports, the method comprising:
   a first step of receiving a channel status information reference signal (CSI-RS) from the base station apparatus; and
   a second step of transmitting feedback information to the base station apparatus, wherein
   the feedback information is information associated with a codebook describing a plurality of first linear filters corresponding to precoding of a first dimension and a plurality of second linear filters corresponding to precoding of a second dimension,
   the CSI-RS, the plurality of first linear filters, and the plurality of second linear filters are associated with a number of the plurality of antenna ports,
   the codebook includes a setting in which a number of the plurality of first linear filters each corresponding to the precoding of the first dimension is equal to a number of the plurality of second linear filters each corresponding to the precoding of the second dimension, and
   the plurality of first linear filters corresponding to the precoding of the first dimension has a same norm as that of the plurality of second linear filters corresponding to the preceding of the second dimension.

9. A base station apparatus that includes a plurality of antenna ports and communicates with a terminal apparatus, the base station apparatus comprising:
   wireless transmission circuitry that transmits a channel state information reference signal (CSI-RS) to the terminal apparatus; and
   wireless reception circuitry that receives feedback information generated based on the CSI-RS from the terminal apparatus, wherein
   the feedback information is information associated with a codebook describing a plurality of first linear filters corresponding to precoding of a first dimension and a plurality of second linear filters corresponding to precoding of a second dimension,
   the CSI-RS, the plurality of first linear filters, and the plurality of second linear filters are associated with a number of the plurality of antenna ports,
   the codebook includes a setting in which a number of the plurality of first linear filters each corresponding to the precoding of the first dimension is equal to a number of the plurality of second linear filters each corresponding to the precoding of the second dimension, and
   the plurality of first linear filters corresponding to the precoding of the first dimension has a same norm as that of the plurality of second linear filters corresponding to the preceding of the second dimension.

10. A communication method of a base station apparatus that includes a plurality of antenna ports and communicates with a terminal apparatus, the method comprising:
   a first step of transmitting a channel state information reference signal (CSI-RS) to the terminal apparatus; and
   a second step of receiving feedback information generated based on the CSI-RS from the terminal apparatus, wherein
   the feedback information is information associated with a codebook describing a plurality of first linear filters corresponding to precoding of a first dimension and a plurality of second linear filters corresponding to precoding of a second dimension,
   the CSI-RS, the plurality of first linear filters, and the plurality of second linear filters are associated with a number of the plurality of antenna ports,
   the codebook includes a setting in which a number of the plurality of first linear filters each corresponding to the precoding of the first dimension is equal to a number of the plurality of second linear filters each corresponding to the precoding of the second dimension, and
   the plurality of first linear filters corresponding to the precoding of the first dimension has a same norm as that of the plurality of second linear filters corresponding to the preceding of the second dimension.

* * * * *